(12) United States Patent
Satoh et al.

(10) Patent No.: US 7,158,083 B2
(45) Date of Patent: Jan. 2, 2007

(54) COMMUNICATION TERMINAL

(75) Inventors: Noriyoshi Satoh, Kanagawa (JP); Kenichi Sato, Miyagi (JP); Yasunori Komukai, Miyagi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 105 days.

(21) Appl. No.: 10/530,739

(22) PCT Filed: Oct. 8, 2003

(86) PCT No.: PCT/JP03/12908

§ 371 (c)(1),
(2), (4) Date: Apr. 8, 2005

(87) PCT Pub. No.: WO2004/034682

PCT Pub. Date: Apr. 22, 2004

(65) Prior Publication Data

US 2006/0097927 A1    May 11, 2006

(30) Foreign Application Priority Data

Oct. 9, 2002  (JP)  ............................ 2002-296519

(51) Int. Cl.
*H01Q 1/24* (2006.01)
(52) U.S. Cl. ................. 343/702; 343/906; 379/433.13; 455/550
(58) Field of Classification Search ................ 343/702, 343/906; 379/433.13; 455/550
See application file for complete search history.

(56) References Cited

U.S. PATENT DOCUMENTS

| 5,966,647 | A | * | 10/1999 | Sawai | ........................ 455/300 |
| 6,285,327 | B1 | | 9/2001 | See | ............................ 343/702 |
| 6,380,895 | B1 | | 4/2002 | Moren et al. | ......... 343/700 MS |
| 7,069,043 | B1 | * | 6/2006 | Sawamura et al. | ....... 455/550.1 |
| 2001/0004269 | A1 | | 6/2001 | Shibata et al. | .......... 348/333.06 |
| 2001/0051510 | A1 | | 12/2001 | Nakamura | ................ 455/575.3 |
| 2002/0006809 | A1 | * | 1/2002 | Kubo et al. | .................. 455/550 |
| 2004/0058721 | A1 | * | 3/2004 | Kanazawa et al. | ......... 455/575.3 |
| 2004/0075620 | A1 | * | 4/2004 | Tanaka et al. | ................ 345/1.1 |
| 2004/0203529 | A1 | * | 10/2004 | Hong et al. | ................. 455/90.3 |

FOREIGN PATENT DOCUMENTS

| EP | 1 093 675 A1 | 4/2001 |
| EP | 1 170 929 A2 | 1/2002 |

(Continued)

*Primary Examiner*—Tho Phan
*Assistant Examiner*—Chuc Tran
(74) *Attorney, Agent, or Firm*—Pearne & Gordon LLP

(57) ABSTRACT

The invention aims at providing a communication terminal capable of suppressing degradation of an antenna gain irrespective of whether the casing of the communication terminal is opened or closed. The communication terminal includes a hinge for coupling in a foldable manner a first casing member and a second casing member, each including conductors such as a first printed board and a second printed board. In close proximity to the hinge in the second casing member is provides a second antenna. The hinge includes a first rotation axis composed of a conductive metal material working as an axis of rotation of two casing members in opposite directions and a second rotation axis composed of a conductive metal material working as an axis of rotation in a direction orthogonal to the direction of rotation about the first rotation axis. A predetermined clearance L to place the conductors of the first and second casing members in capacity coupling is formed and the hinge is insulated from the conductor of one of the two casing members.

10 Claims, 21 Drawing Sheets

FOREIGN PATENT DOCUMENTS

| | | |
|---|---|---|
| EP | 1 266 425 A1 | 12/2002 |
| JP | 06-311216 | 4/1994 |
| JP | 10-64648 | 3/1998 |
| JP | 11-030226 | 2/1999 |
| JP | 2000-165124 | 6/2000 |
| JP | 2000-187085 | 7/2000 |
| JP | 2001-169166 | 6/2001 |
| JP | 2001-326524 | 11/2001 |
| JP | 2002-027066 | 1/2002 |
| JP | 2002-033804 | 1/2002 |
| JP | 2002-33805 | 1/2002 |
| JP | 2002-504768 | 2/2002 |
| JP | 2002-246822 | 8/2002 |
| JP | 2002-246935 | 8/2002 |
| JP | 2003-527015 | 9/2003 |
| WO | WO 99/03168 | 1/1999 |

\* cited by examiner

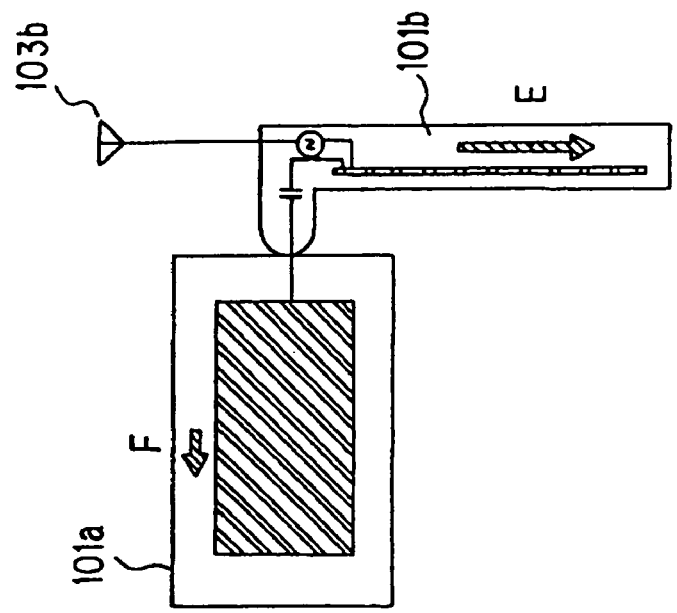
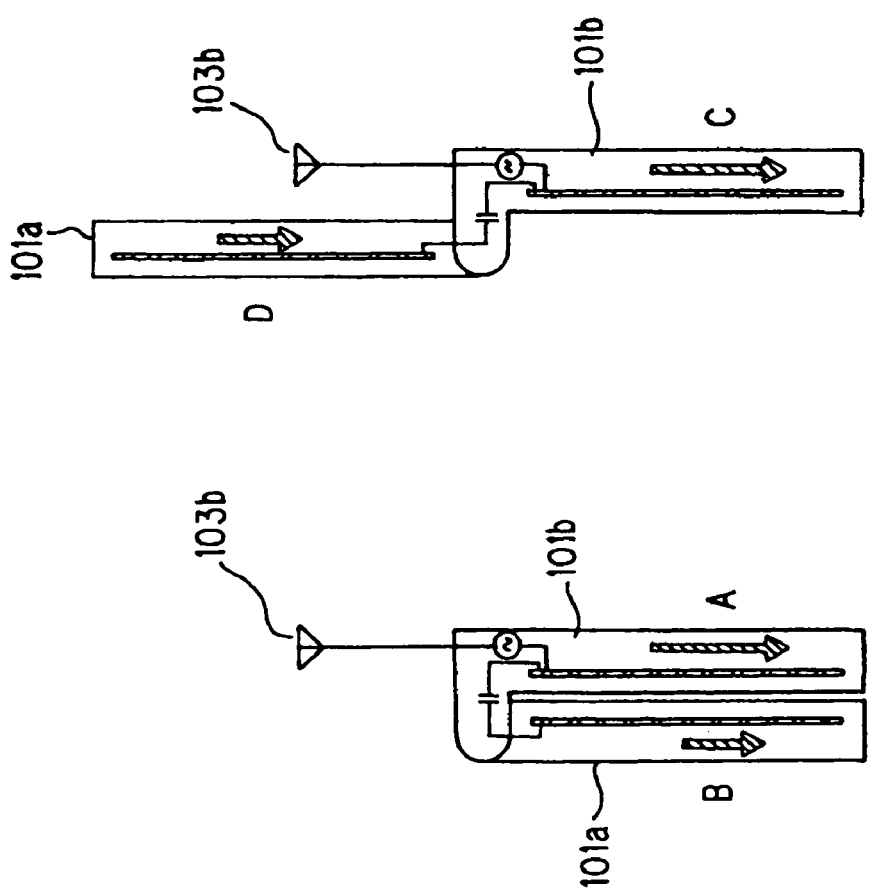
FIG. 16 (a)
FIG. 16 (b)
FIG. 16 (c)

x-y PLANE
(WHEN THE CASINGS ARE OPENED)

x-y PLANE
(WHEN THE CASINGS ARE CLOSED)

FIG. 21 (a)
FIG. 21 (b)
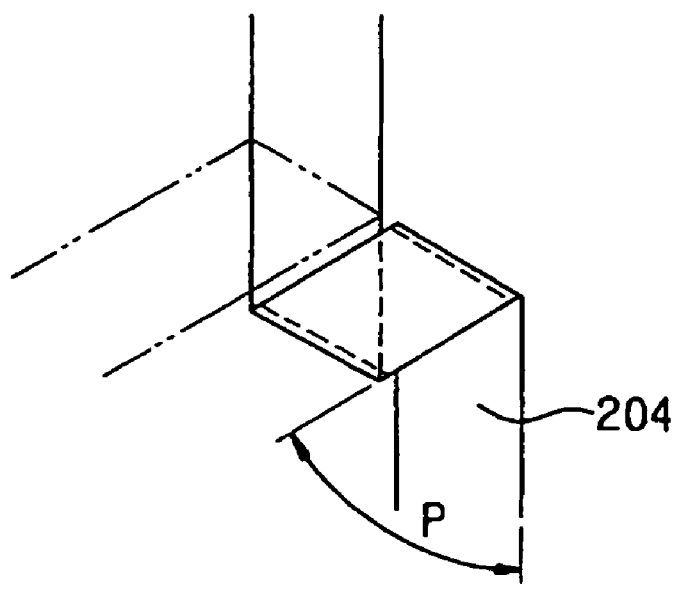
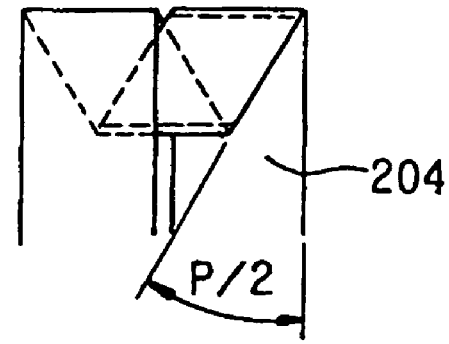

COMMUNICATION TERMINAL

This application is a 371 of PCT/JP03/12908 Oct. 8, 2003.

TECHNICAL FIELD

The present invention relates to a communication terminal having foldable casings, and in particular to a casing structure of a communication terminal equipped with an antenna for transmitting/receiving a radio signal.

BACKGROUND ART

A first example of a prior art foldable communication terminal is one described in Patent Document 1. The prior art foldable communication terminal is described below referring to drawings. FIG. 20 shows the structure of a prior art communication terminal and the principle of operation of the antenna provided thereon. FIG. 20A shows a state where the casings are closed and FIG. 20B a state where the casings are opened. In FIGS. 20A and 20B, the communication terminal includes a first casing 202 connected to a telescopic antenna 201 and a second casing 203 positioned on the side of the antenna, the second casing including a metal material or a material including a metal, the first and second casings 202, 203 interconnected. The communication terminal is designed so that the high-frequency current flowing through the first casing 202 where the antenna 201 is equipped will also flow into the second casing 203. The directions of the currents are shown by arrows G, H, I and J.

A second example of a prior art foldable communication terminal is disclosed in Patent Document 2. This communication terminal has a structure that a first casing where an antenna is provided at one end is coupled to a second casing in a foldable manner via a hinge and a flexible board wound in a helical fashion is arranged in the hinge. FIG. 21 shows a change of the flexible board which accompanies opening/closing operation of the casing in case the flexible board is provided in a helical fashion. In FIG. 21, (a) shows a state where the casings are opened and (b) shows a state where the casings are closed. The shape of the flexible board 204 in FIG. 21(a) while the casing is opened is shown by solid lines, and by chain double-dashed lines while the casing is closed so as not to change the angle of twist.

(Patent Document 1)
JP-A-2002-33804

(Patent Document 2)
JP-A-6-311216

On the communication terminal of the first prior art example, the first and second casings are connected so that the currents flowing through the casings 202, 203 will be in same phase with each other (arrows G and H are in the same direction). That is, each current flows from the end where the antenna 201 is provided to the opposite end. When the two casings are opened, the casing current (arrow I) flowing through the first casing 202 stays the same as that the casing current (arrow G) flowing when the casing is closed. On the other hand, the direction of the casing current (arrow J) flowing through the second casing 203 is different from, or in opposite phase with, that of the casing current (arrow H) flowing through the first casing member 202. Thus, the radiation effect could be deteriorated when the state of the casings is shifted from the closed state to the opened state. Depending on the connection manner of casing and an antenna, the radiation effect could be deteriorated.

The communication terminal in the second example has a structure that the antenna protrudes from the casing. Such a protruding antenna has a problem that the antenna gets snagged on the edge of a pocket when the user takes out the communication terminal from the pocket. In recent years, a foldable hinged communication terminal with an integrated antenna has been in growing demand.

As shown in FIG. 21, the flexible board 204 wound in a helical manner is subject to a bending stress and a twisting stress with the opening/closing operation of the casings, which could break the conductive portion (circuit pattern) of the flexible board 204. In order not to change the twist angle of the flexible board wound clockwise from the bottom to the top, the flexible board is wound in chain double-dashed lines shown in FIG. 21(a), thus avoiding the twisting stress. However, both ends of the flexible board 204 are fixed to the same positions of the casings (in the same horizontal direction) irrespective of the opening/closing operation of the casings. When the casing is closed into a shape shown in the solid lines in FIG. 21(b) from the open state, the twist angle changes to an approximate P/2. Thus, the flexible board 204 is subject to a bending stress and a twisting stress in accordance with the opening/closing operation of the casings.

In general, a flexible board is flexible so that it is resistant enough to a bending stress. A composite stress exerted on the flexible board invites a wire break or rupture. Thus, in the prior art, repeating the opening/closing operation of casings could bring about the wire break or rupture of the casings, which has required improvement.

The invention has been accomplished in view of the above problems and has as an object to provide a communication terminal capable of suppressing the degradation of an antenna gain irrespective of whether the casing of the communication terminal is opened state or closed state.

DISCLOSURE OF THE INVENTION

A communication terminal according to the invention includes a hinge portion, which connects two casing members having conductive portions so as to freely open and close, and an antenna, which is provided near the hinge portion in one casing member of the two casing members. The hinge portion includes a first rotating member, which is formed by conductive material and which serves as an axis for rotating the two casing members in an opposed direction of the two casing members, and a second rotating member, which is formed by the conductive material and which serves as an axis for rotating one casing member of the two casing members relative to the other casing member under a non-opposed state of the two casing members in a direction perpendicular to a rotating direction while the first rotating member serves as the axis. A predetermined interval for capacity coupling of the conductive portions of the two casing members is set. The hinge portion is insulated from one of the conductive portions of the two casing members.

With this configuration, it is possible to eliminate an opposite-phase high-frequency current flowing from one casing member to another via the hinge portion in a state that the two casing members are opened. While the two casing members are closed, the high-frequency current flowing into the other casing member can be in same phase with that flowing into the one casing member. It is thus possible to suppress the degradation of antenna gain irrespective of whether the casing members are opened or closed.

The communication terminal according to the invention is characterized in that a flexible conductor which connects the conductive portions of the two casing members is disposed in one end side of the first rotating member, and a feeding part of the antenna is disposed in the other end side of the first rotating member.

With this configuration, even in case the flexible conductor and the antenna are arranged in close proximity in a foldable communication terminal including a flexible board provided in a hinge portion, the flexible board and the feeding portion of the antenna are separated. Thus the effect of the flexible board on the antenna performance can be eliminated.

The communication terminal according to the invention is characterized in that a winding portion is formed on the flexible conductor disposed in the one end side of the first rotating member.

With this configuration, break or rupture of the flexible board caused by the opening/closing operation of the casing members can be avoided, which prolongs the service life of the flexible board. The curvature of the winding portion changes with the opening/closing operation of the two casings. A flexible conductor is arranged at the opposite end to the feeding part where a high-frequency current flows. Thus, even when the flexible conductor is in close proximity to the antenna, it is possible to avoid the degradation of characteristics of voltage standing wave ratio (VSWR) as an antenna characteristic, thereby obtaining a stable antenna gain.

The communication terminal according to the invention is characterized in that a cable which connects the conductive portions provided in the two casing members, and the cable is inserted into the winding portion.

With this configuration, the cable length can be reduced to minimum in case the conductors in two casings are connected to each other with a cable.

The communication terminal according to the invention is characterized in that the antenna is extended from the one end side to the other end side of the first rotating member.

With this configuration, it is possible to avoid the degradation of antenna performance even in case an antenna is arranged without protruding from the casing, thereby obtaining sufficient radiation characteristics.

The communication terminal according to the invention is characterized in that the antenna has a first element part having a first electric length and a second element part having a second electric length, the one end sides of the first element part and the second element part are connected to each other by a reactance part having a reactance component, and the other end side of one element part of the two element parts serves as a feeding part.

With this configuration, a single antenna has a plurality of resonance points (resonance frequencies) so that it is possible to prevent an antenna gain in a low frequency band irrespective of whether the casing is opened or closed.

The communication terminal according to the invention is characterized in that the electric length of the first element part is set to ¼ times as long as the wavelength $\lambda 1$ of a first frequency, and the electric length of the second element part is formed so that the sum of the electric length of the second element part and the electric length of the first element part is set to ¼ or ⅜ times as long as the wavelength $\lambda 2$ of a second frequency.

With this configuration, a favorable antenna characteristic is obtained in each of the first and second frequencies.

The communication terminal according to the invention is characterized in that a receiving part and a transmitting part are provided in exposed surface sides of the two casing members which are exposed when the two casing members are changed from a closed state to a opened state, and the antenna is disposed near the hinge portion provided in a back surface side opposite to the exposed surfaces.

With this configuration, when the user holds the casings in his/her hand to make a call, the antenna is less likely to be covered by the user's hand and the antenna is placed away from the head of the user. This reduces the amount of an electromagnetic wave absorbed by a human body.

BRIEF DESCRIPTION OF THE DRAWINGS

FIG. 16 illustrates the operation principle of the second antenna used for the communication terminal according to this embodiment, (a) showing in a closed state, (b) showing in the first opened state, and (c) showing in the third opened state;

FIG. 21 illustrates the deformation in accordance with the opening/closing operation of a flexible board wound in a helical manner provided in a prior art communication terminal, (a) showing the casings in an opened state and (b) showing in a closed state.

Figure 1:
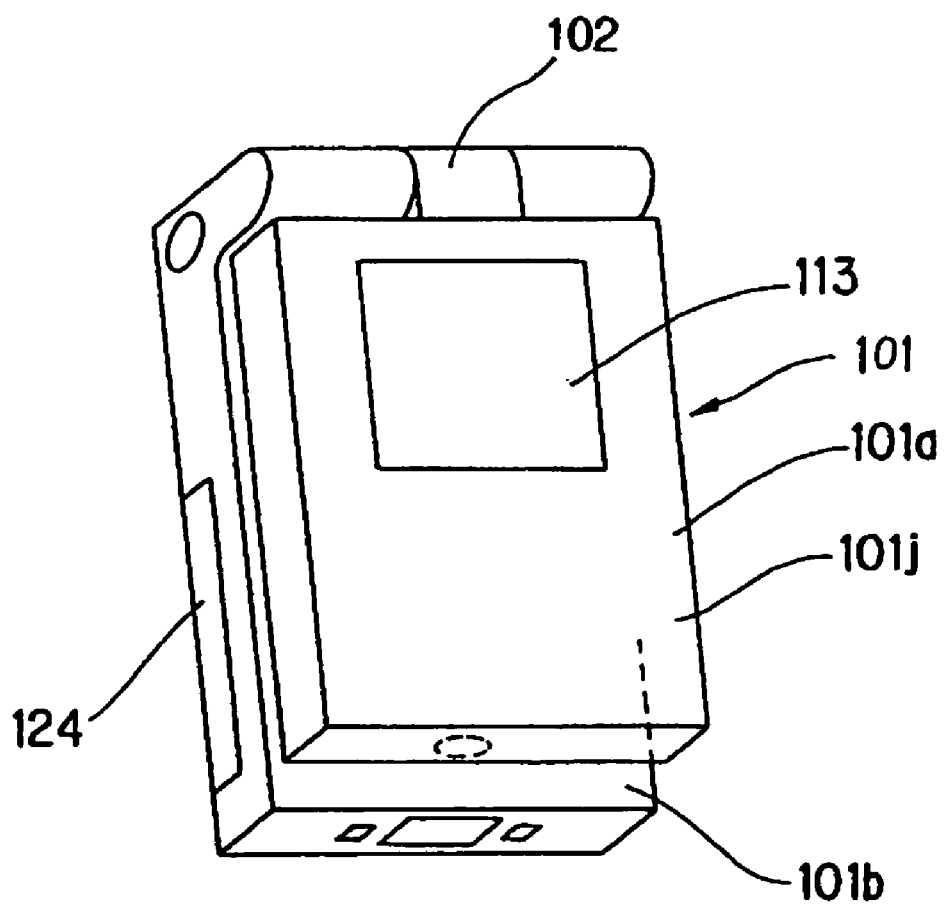
FIG. 1 is a perspective view of a foldable communication terminal according to an embodiment of the invention in a closed state.

In the drawings, a numeral 101 represents a casing, 101a a first casing member, 101b a second casing member, 101c, 101d a hinge mounting portion, 101e a D-shaped hole, 101f a bearing, 101g a main face of the second casing member, 101h a right side of the second casing member, 101j a main face of the first casing member, 101j a rear face of the first casing member, 101k an inner face of the second casing member, 102 a hinge, 103 an antenna, 103a a first antenna, 103b a second antenna, 103c a first element, 103d a second element, 103e a reactance portion, 103f a concave portion, 103g a convex portion, 103h a power feeding portion, 104 a vibrator, 105 an operating portion 105a a first operating portion 105b a second operating portion, 106 a receiver, 107 a loudspeaker, 108 a microphone, 109 a camera portion 109a a first camera portion 109b a second camera, 110 a first Hall element, 111 a second Hall element, 112 a first display portion, 113 a second display portion, 114 a first permanent magnet, 115 a second permanent magnet, 116 a printed board, 116a a first printed board, 116b a second printed board, 117 a transceiver, 118 a data processor, 119 a speech processor, 120 an image processor, 121 an information recording portion, 122 a control portion, 123a a protrusion, 123b a clearance, 124 a battery, 125 a first rotation axis, 125a a notch, 125b a support, 125c a partition, 125d a slot, 125e a screw hole, 126 a second rotation axis, 127 a support plate, 127a a concave portion, 127b a support hole, 128 a guide axis, 128a a large diameter portion, 128b a small diameter portion, 128c a parallel groove, 128d a D-cut portion, 129 a first coil spring, 130 a first click convex plate, 130a a convex portion, 131 a first click concave plate, 131a a concave portion, 132 a cam, 133 a second click convex plate, 133a a convex portion, 134 a second coil spring, 135 a bracket, 135a a hole, 136 an E-ring, 137 a first rotation axis bearing 137a a groove, 138 a hinge unit, 139 a flexible board, 139a a corner, 139b a first winding portion, 139c a second winding portion, 140 a cable, 141 a front cover, 141a an engaging claw, 141b a screw through hole, 142 a rear cover, 142a an engaging claw, 142b a screw through hole, and 143a, 143b a tightening screw.

BEST MODE FOR CARRYING OUT THE INVENTION

Embodiments of the foldable communication terminal according to the invention are described below referring to drawings. While the communication terminal is described as a foldable cell phone supporting both the W-CDMA (Wideband Code Division Multiple Access) system and the GSM (Global System for Mobile Communication), the invention is applicable to other foldable communication terminals also.

Figure 2:
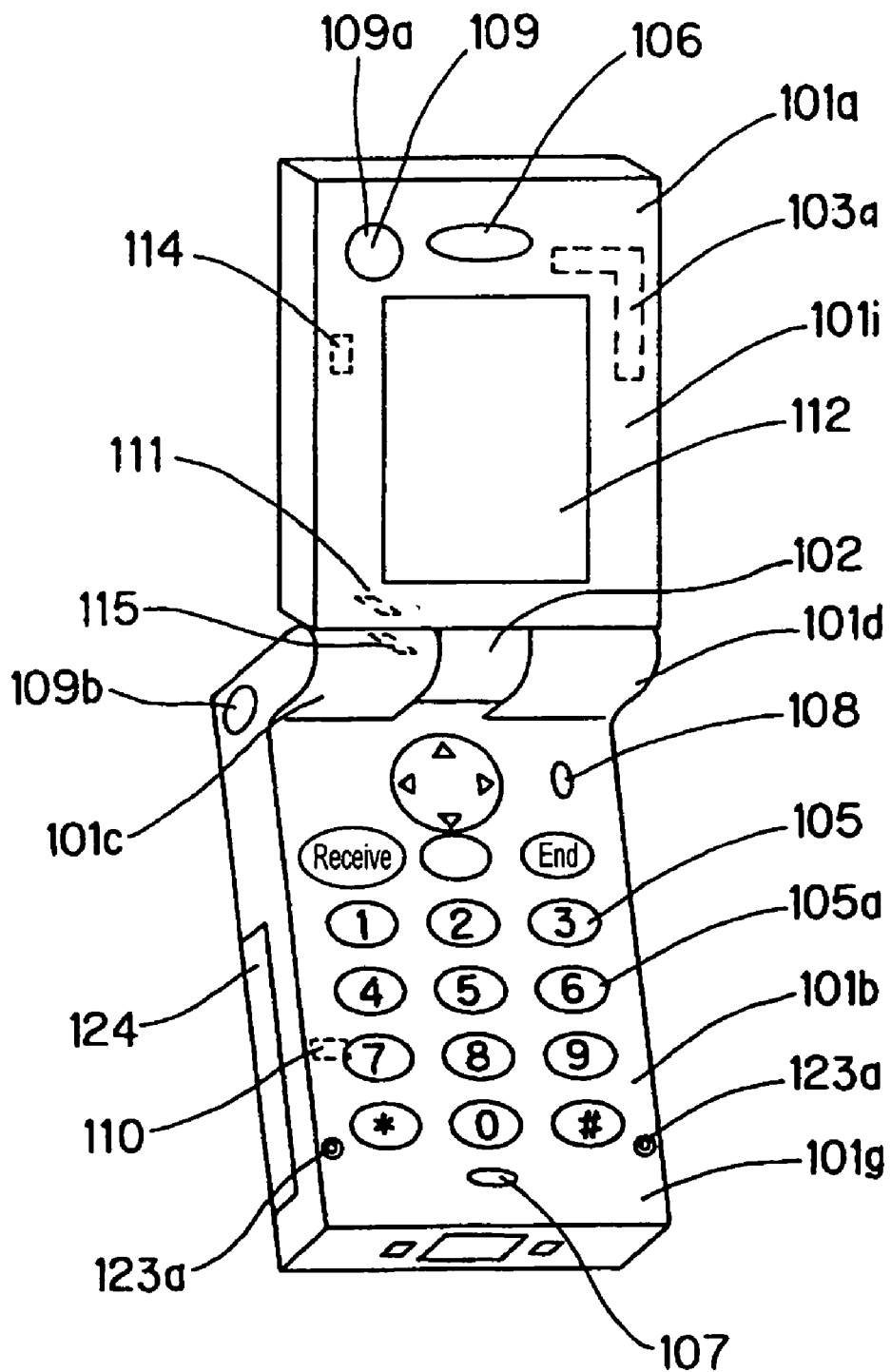
FIG. 2 is a perspective view of a foldable communication terminal according to the embodiment of the invention in a first opened state.
Figure 3:
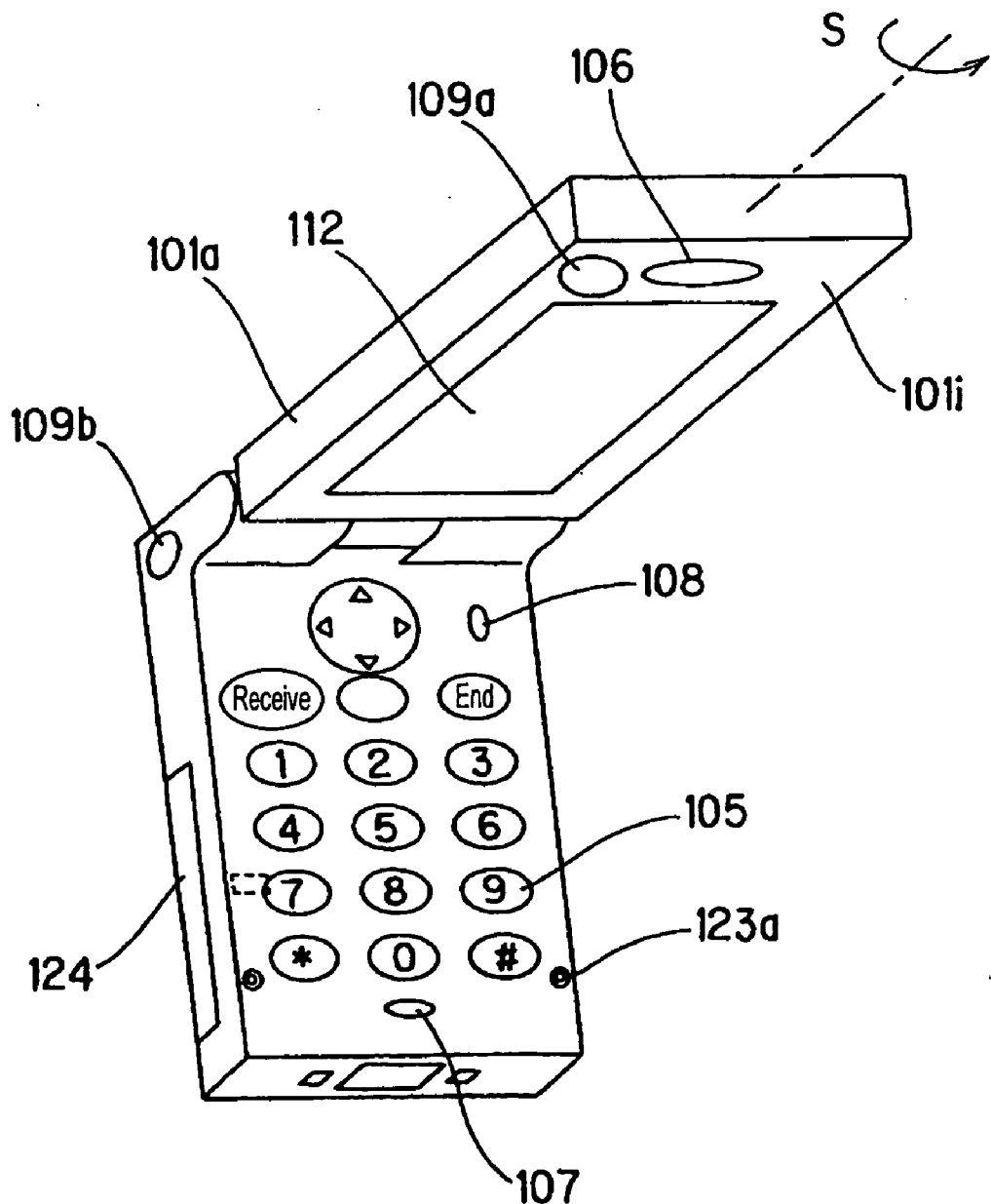
FIG. 3 is a perspective view of a foldable communication terminal according to the embodiment of the invention in a second opened state.
Figure 4:
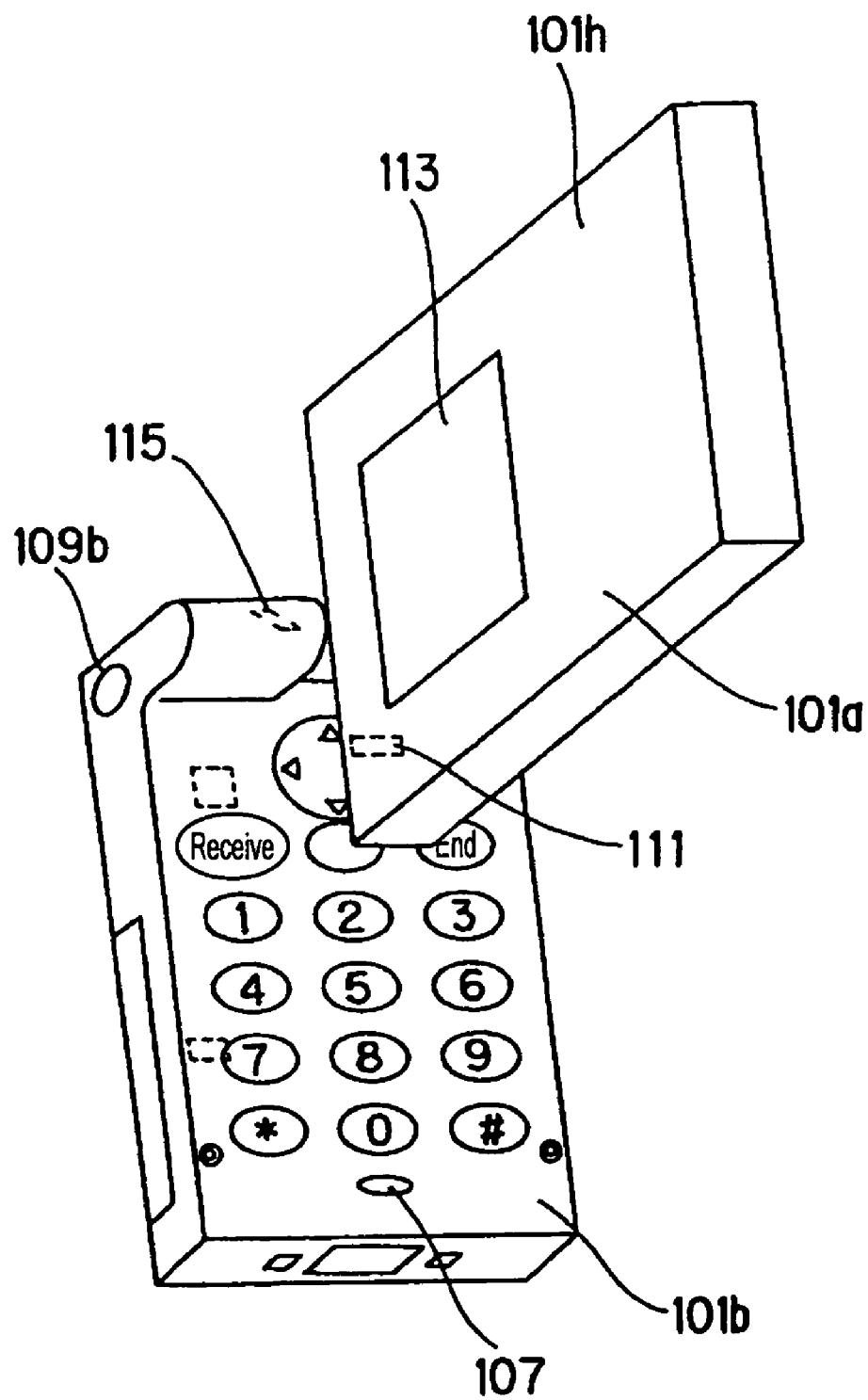
FIG. 4 is a perspective view of a foldable communication terminal according to the embodiment of the invention in a third opened state.
Figure 5:
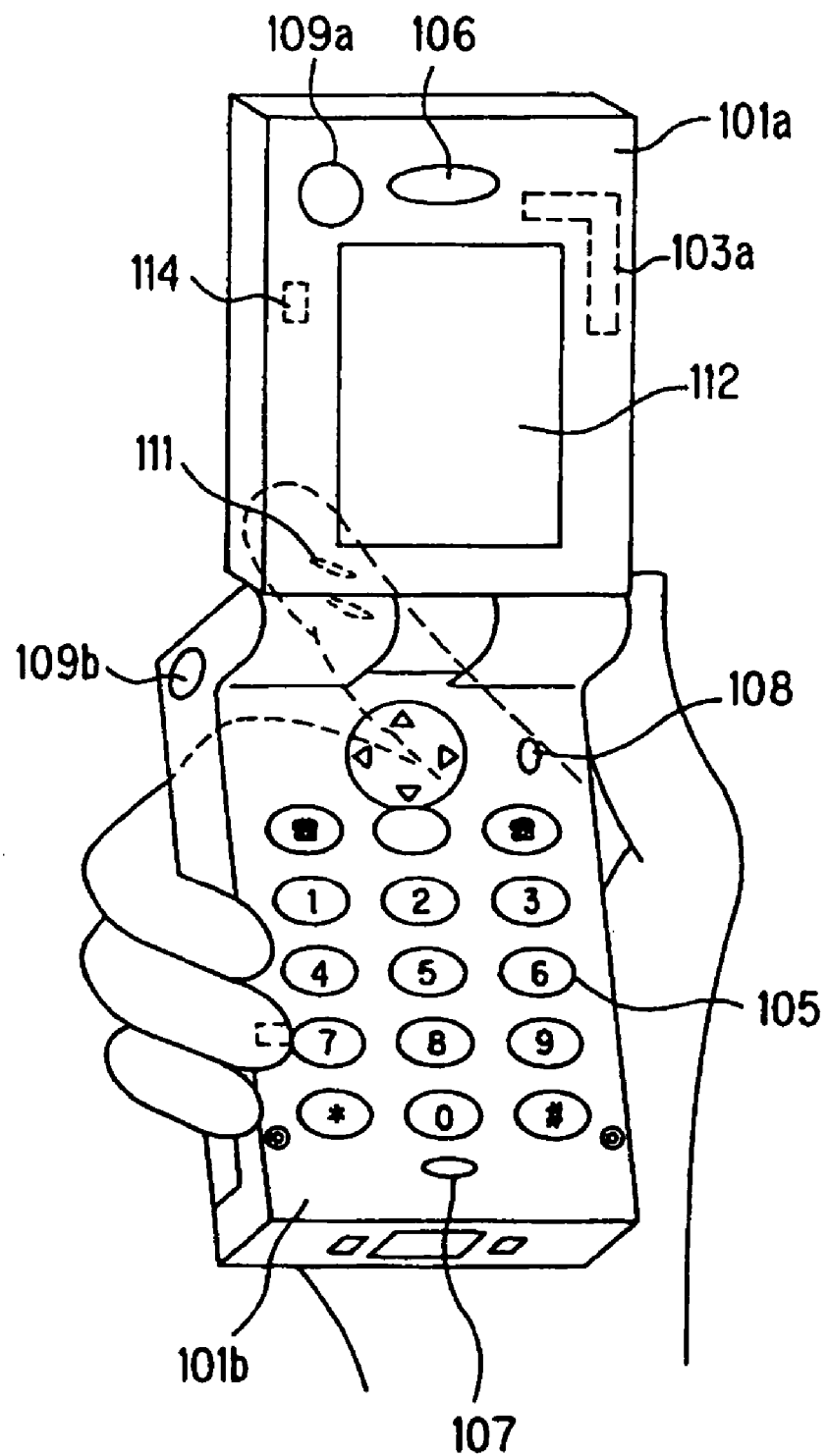
FIG. 5 is the external view the communication terminal in the first opened state held in a hand.
Figure 6:
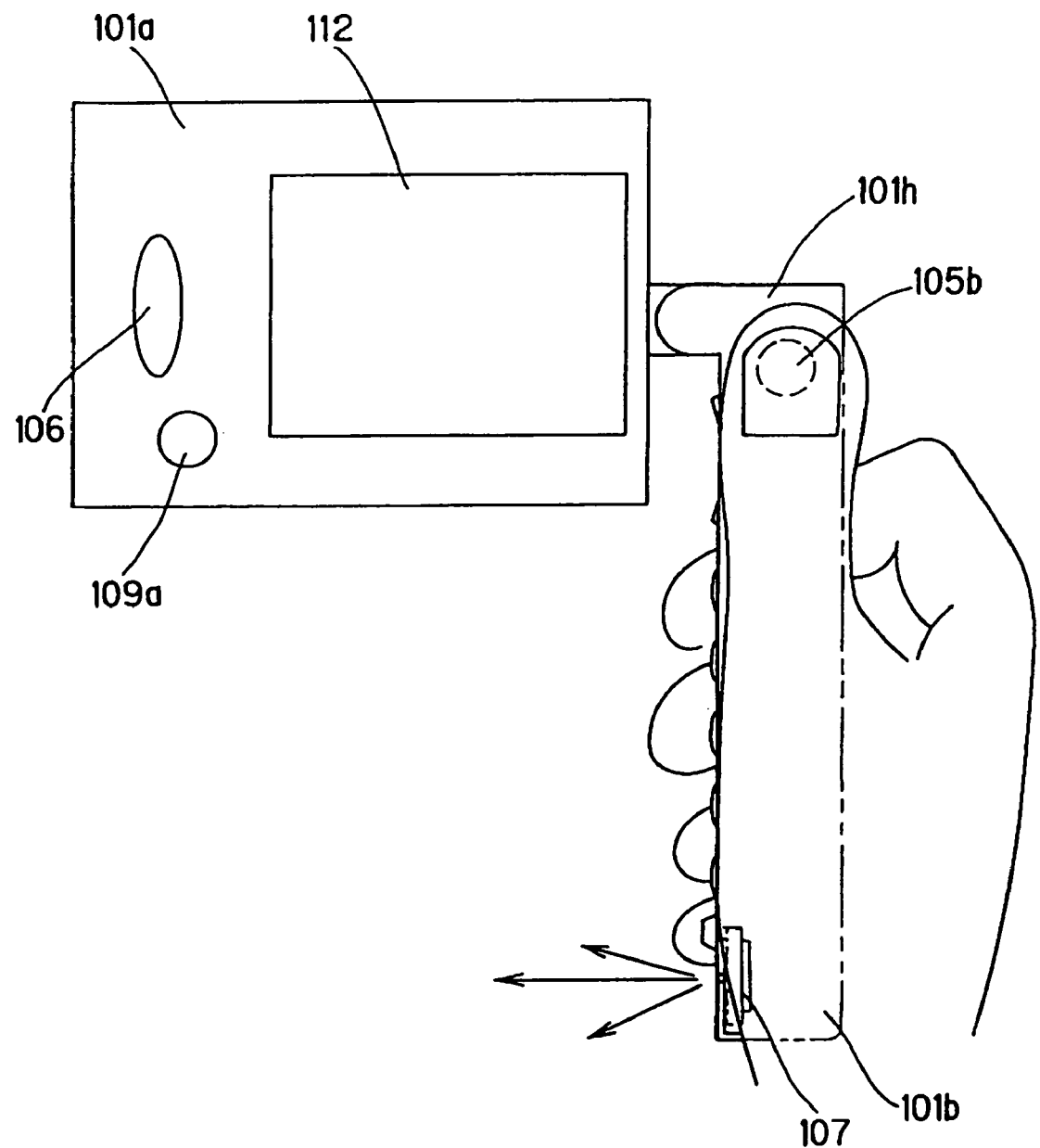
FIG. 6 is an external view the communication terminal in the third opened state held in a hand.
Figure 7:
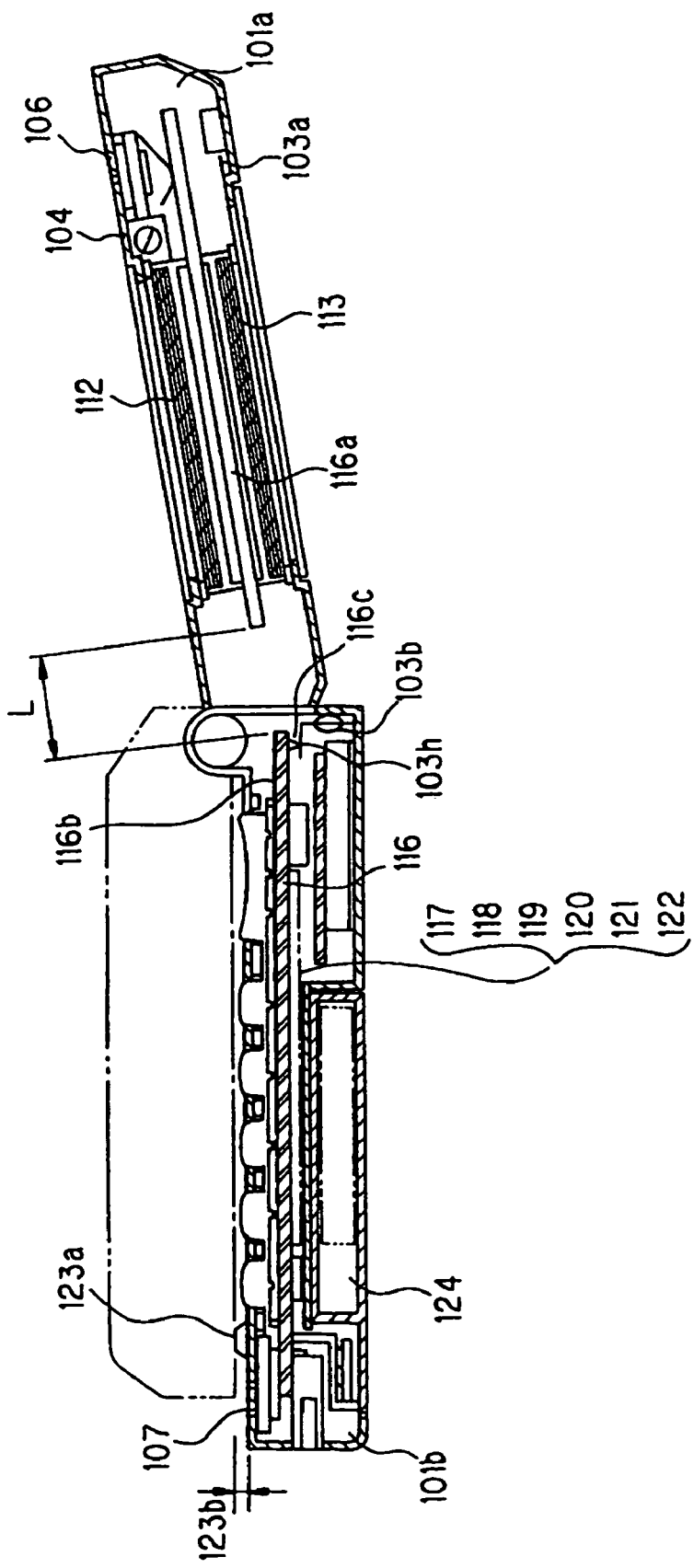
FIG. 7 is a sectional view of a foldable communication terminal according to the embodiment of the invention.
Figure 8:
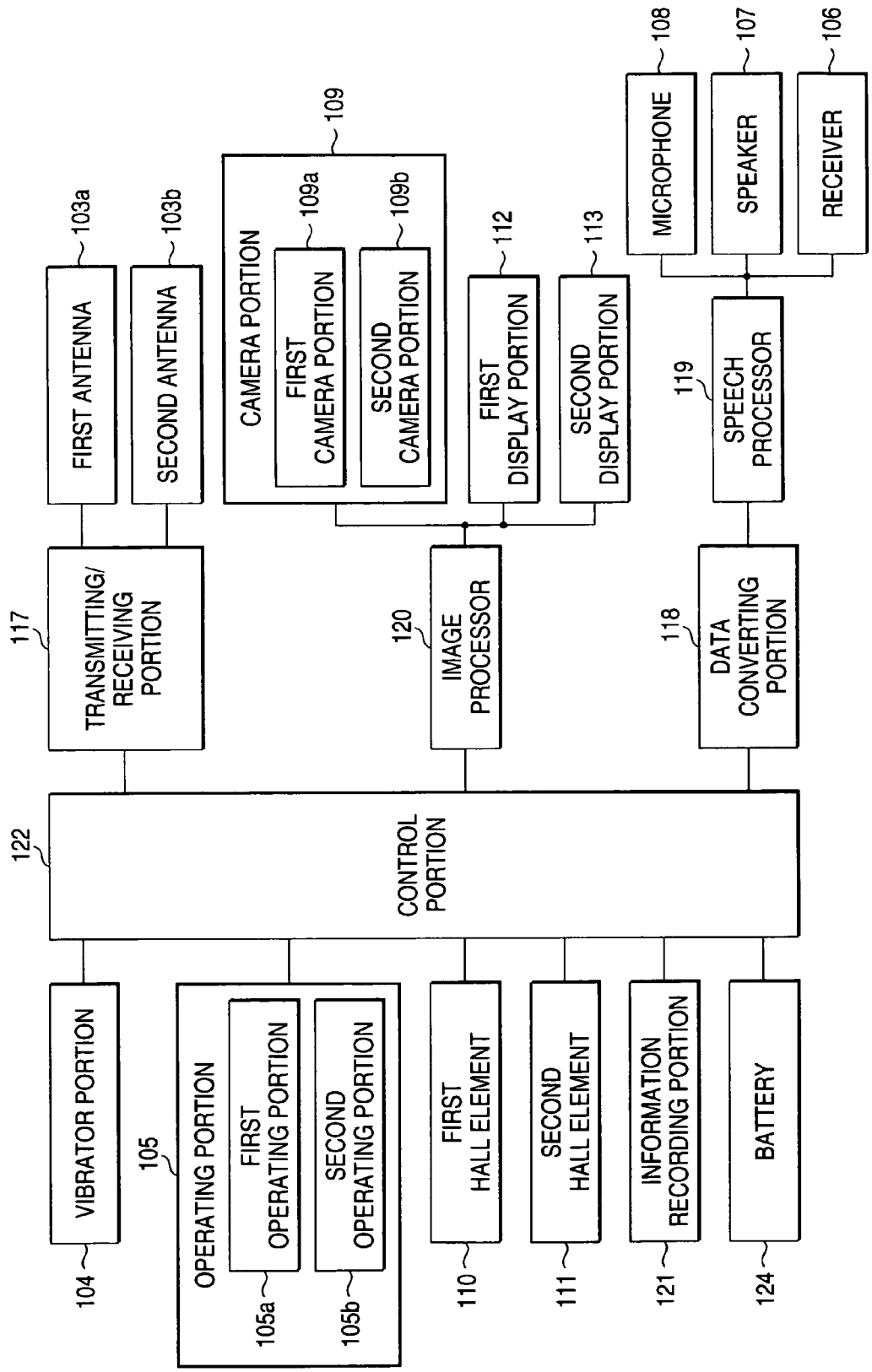
FIG. 8 is a block diagram showing the electrical configuration of a communication terminal according to the embodiment of the invention.

FIG. 1 is a perspective view of a foldable communication terminal according to an embodiment of the invention in a closed state. FIG. 2 is a perspective view of a foldable communication terminal according to an embodiment of the invention in a first opened state. FIG. 3 is a perspective view of a foldable communication terminal according to an embodiment of the invention in a second opened state. FIG. 4 is a perspective view of a foldable communication terminal according to an embodiment of the invention in a third opened state. FIG. 5 is an external view the communication terminal in the first opened state help in a hand. FIG. 6 is an external view the communication terminal in the third opened state help in a hand. FIG. 7 is a sectional view of a foldable communication terminal according to an embodiment of the invention. FIG. 8 is a block diagram showing the electrical configuration of a communication terminal according to an embodiment of the invention.

As shown in FIGS. 1 through 8, a foldable communication terminal according to this embodiment includes a casing 101, a hinge portion 102, an antenna 103, a vibrator portion 104, an operating portion 105, a receiving portion (receiver) 106, a speaker 107, a transmitting portion (microphone) 108, a camera portion 109, a first Hall element 110, a second Hall element 111, a first display portion 112, a second display portion 113, a first permanent magnet 114, a second permanent magnet 115, and a printed board 116. The printed board 116 includes a transceiver 117, a data converter 118, a speech processor 119, an image processor 120, an information recording portion 121 and a control portion 122, as shown in FIG. 8.

Components of the communication terminal according to this embodiment are described below.

Figure 9:
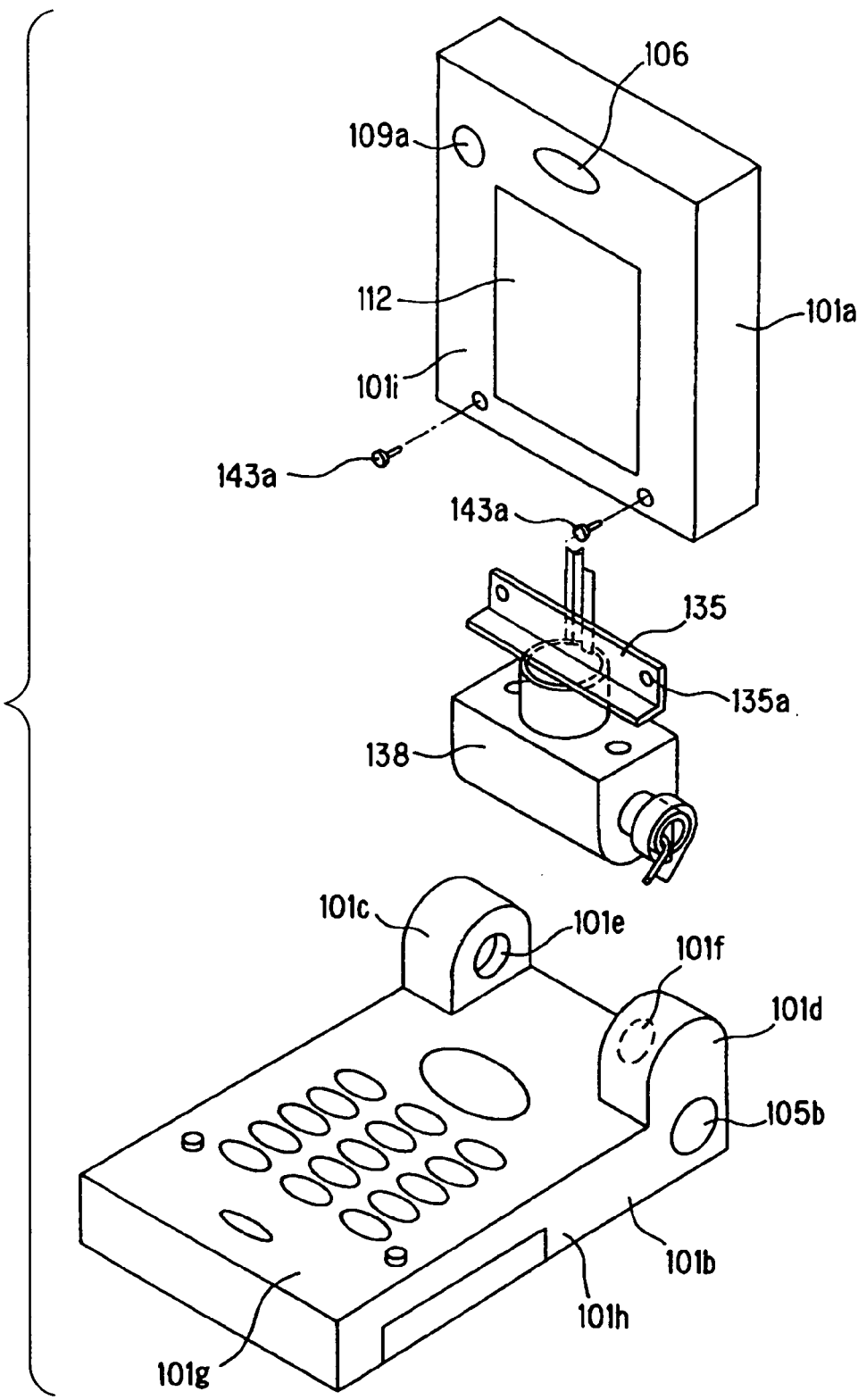
FIG. 9 is an exploded perspective view of the casing of the foldable communication terminal according to the embodiment.

The casing 101 is described first. The casing 101 includes a first casing member 101a and a second casing member 101b. FIG. 9 is an exploded perspective view of the casing 101 of the foldable communication terminal according to this embodiment. As shown in FIG. 9, a hinge mounting portions 101c, 101d for holding the hinge portion 102 are formed on the second casing member 101b. A D-shaped hole 101e for holding the hinge portion 102 is formed on the hinge mounting portion 101c. A bearing 101f for supporting the hinge portion 102 is formed on the hinge mounting portion 101d.

The first casing member 101a and the second casing member 101b of the casing 101 can be opened and closed about the hinge portion 102 as an axis. In the following description, a state where the first casing member 101a is closed onto the second casing member 101b is called the "closed state" and a state where the first casing member 101a is opened with respect to the second casing member 101b is called the "opened state". Typically, the communication terminal is carried in the closed state and used in the opened state. As shown in FIG. 2, a state where the angle formed by the first casing member 101 and the second casing member 101b is approximately 180 degrees is called the "first opened state". As shown in FIG. 3, a state where the angle formed by the first casing member 101 and the second casing member 101b is approximately 90 degrees is called the "second opened state".

The first and second casing members 101a, 101b are coupled to each other so that they can be rotated in the direction orthogonal to the opening/closing direction in the second opened state, as shown in FIGS. 4 and 6. The configuration rotatable in the orthogonal direction will be described later. A state shown in FIG. 4 where the first casing member 101a is rotated from the opened state in FIG. 3 by 90 degrees in the direction of an arrow S, that is, in the direction orthogonal to the opening/closing direction, is called the "third opened state". The first casing member can be rotated up to 150 degrees in the direction of S. In the third opened state, the first display portion 112 is in landscape orientation, which is preferable in displaying an image of VGA size. This allows display of a larger image than when the same display portion is in portrait orientation.

In this embodiment, a protrusion 123a is formed on the surface of the second casing member 101b which abuts the first casing member 101a in the closed state. Thus, a clearance 123b produced by the protrusion 123a is formed between the first casing member 101a and the second casing member 101b in the closed state.

Other components will be described. The antenna 103 includes a first antenna 103a and a second antenna 103b. The first antenna 103a housed in the first casing member 101a is an antenna which performs communications of W-CDMA system in the opened state alone. While the casing is in the closed state, communications using the antenna 103a are unavailable. The second antenna 103b, in the first place, performs communications of W-CDMA system in the closed state and in the second place, performs communications in the GSM band in either the opened or closed state. The second antenna is a multifrequency antenna which has a resonant point in the 900 MHz band, 1.8 GHz band and 1.9 GHz band as GSM bands as well as 2 GHz band as a W-CDMA band in order to perform communications in these four bands.

As shown in FIG. 8, the transceiver 117 is connected to the first and second antennas 103a, 103b and processes data received by the first and second antennas 103a, 103b and transmits the processed data to the data converter 118. The data converter 118 converts the received data to voice data and transmits the data to the speech processor 119. The speech processor 119 decodes the voice data to generate a speech signal and transmits the speech signal to the receiving portion 106 and the speaker 107. The receiving portion 106 and the speaker 107 output voice corresponding to the speech signal transmitted from the speech processor 119.

The speech processor 119 encodes the voice picked up by the microphone to generate voice data and transmits the voice data to the data converter 118. The data converter 118 converts the transmitted voice data to communications data and transmits the communications data to the transceiver 117. The transceiver 117 processes the received communications data and transmits the data in the form of a radio wave carrying a radio signal via the antenna 103.

As shown in FIG. 8, the camera portion 109, the first display portion 112 and the second display portion 113 are connected to the image processor 120. The receiving portion 106, the speaker 107 and the microphone 108 are connected to the speech processor 119. The speech processor 119 is connected to the data converter 118. The control portion 122 is connected to the vibrator 114, the operating portion 115, the first Hall element 110, the second Hall element 111, the transceiver 117, the data converter 118 and the information recording portion 121 and controls these components. The control portion 122 is connected to the battery 124, which feeds power.

The vibrator portion 104 vibrates on call termination to notify the user of an incoming call by way of vibration. The operating portion 105 includes a first operating portion 105 and a second operating portion 105b. The first operating portion 105a is provided on a side 101g of the second casing member 101b (main face of the second casing member) which is opposed to the first casing member 101a in the closed state. The second operating portion 105b is provided on the right side 101h of the opposed side 101g (right side of the second casing member). The user manipulates the operating portion to perform call answering, call release, adjust the volume of the receiving portion 106 and the speaker 107 as well as enter characters, symbols and numerals. The user can manipulate the operating portion 105b to operate the camera portion 109.

The first and second display portions 112, 113, which may be liquid crystal displays, display characters, symbols, numerals, images and maps. The first display portion 112 is provided on a side 101j of the first casing member 101a (main face of the first casing member) exposed when the casing 101 is in the closed state and is opposed to the first operating portion 105a in case the casing is closed. The second display portion 113 is provided on the side 101j (rear face of the first casing member) opposite to the side where the first display portion 112 is provided. The receiving portion 106, the speaker 107 and the microphone 108 are provided on an exposed face exposed when the casing 101 is changed from the closed state to the opened state, that is, on the main faces 10i, 101g of the first and second casing members 101a, 101b. The second antennas 103b is provided close to the rear face opposite to the exposed face.

The camera portion 109 includes a first camera portion 109a and a second camera portion 109b. The first camera portion 109a is provided in a position adjacent to the first display portion 112 where a subject in the forward direction of the first display portion 112 can be photographed. The second camera portion 109b is provided on the hinge mounting portion 101c where a subject in the forward direction of the second display portion 113 can be photographed in the third opened state.

An incident light from a subject captured by the first camera portion 109a is converted from an optical signal to an electric signal to form image information. The image information is processed by the image processor 120 and displayed on the first and second display portions 112, 113. The image information undergoes predetermined operation and is recorded in the information recording portion 121. The information recording portion 121 also records telephone number information and voice information, image information other than that of the photographed image (such as received image information), as well as text information such as text in a mail being prepared or transmitted/received.

The speaker 107 outputs a ringing tone on call termination to notify the user of an incoming call. The speaker 107 is provided at an end away from the hinge mounting portions 101c, 101d of the second casing member 101b, so that The speaker 107 outputs a voice toward the first casing member 101a which is opposed thereto when the casing 101 is in the closed state. The speaker 107 can output voice of a larger volume than the receiving portion 106 in the hand-free mode or videophone mode.

The receiving portion 106 outputs voice when the communication terminal according to this embodiment is used as an ordinary cell phone. The voice output from the receiving portion 106 is directed in the forward direction of the first display portion 112. The receiving portion 106 is provided at the end of the first casing member 101a opposed to the speaker 107. The user places the casing 101 in the first opened state to answer a call, and after a predetermined operation, brings the receiving portion 106 at his/her ear to listens to a voice. The microphone 108 is provided in close proximity to the hinge mounting portion 10d of the main face of the second casing member 101b.

The first permanent magnet 114 is provided in close proximity to the first display portion 112 of the first casing member 101a. The first Hall element 110 is provided on the second casing member 101b so that it will be opposed to the first permanent magnet while the casing 101 is in the closed state. The second permanent magnet 115 is provided in the hinge portion 102. The second Hall element 111 is provided on the first casing member 101a so that it will be opposed to the second permanent magnet 115 while the casing 101 is in the closed state or in the first opened state.

While the casing 101 is in the closed state, the first permanent magnet 114 comes in proximity to the first Hall element 110, so that the first Hall element detects the first permanent magnet 114 and transmits a detection signal to the control portion 122. Unless the casing 101 is in the closed state (first, second and third opened state), the first permanent magnet 114 is isolated from the first Hall element 110 so that the first Hall element 110 cannot detect the first permanent magnet 114 thus the first Hall element 110 does not generate a detection signal.

While the casing 101 is in the closed state, first opened state or second opened state, the second permanent magnet 115 comes in close proximity to the second Hall element, so that the second Hall element detects the second permanent magnet 115 and transmits a detection signal to the control portion 122. While the casing 101 is in the third opened state, the second permanent magnet 115 is isolated from the second Hall element 111 so that the second Hall element 111 cannot detect the second permanent magnet 115 thus the second Hall element 111 does not generate a detection signal. The control portion 122 recognizes the opened/closed state and rotating state of the first casing member 101a and the second casing member 101b based n whether a detection signal is received from the first casing member 101a and the second casing member 101b.

The printed board 116 includes a first printed board 116a and a second printed board 116b. The first printed board 116a is housed in the first casing member 101a while the second printed board 116b is housed in the second casing member 101b.

Figure 10:
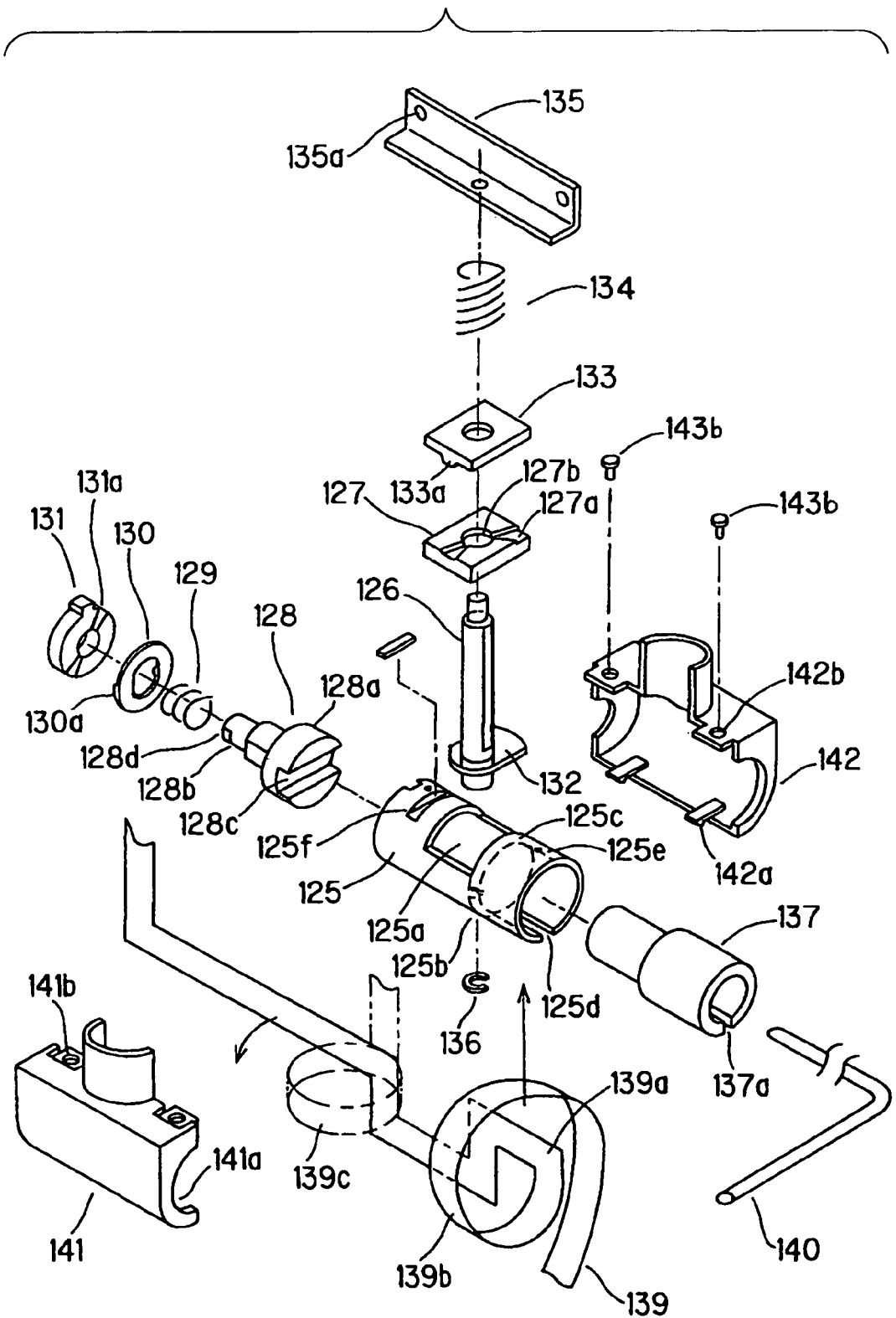
FIG. 10 is an exploded perspective view of the hinge of the foldable communication terminal according to the embodiment.
Figure 11:
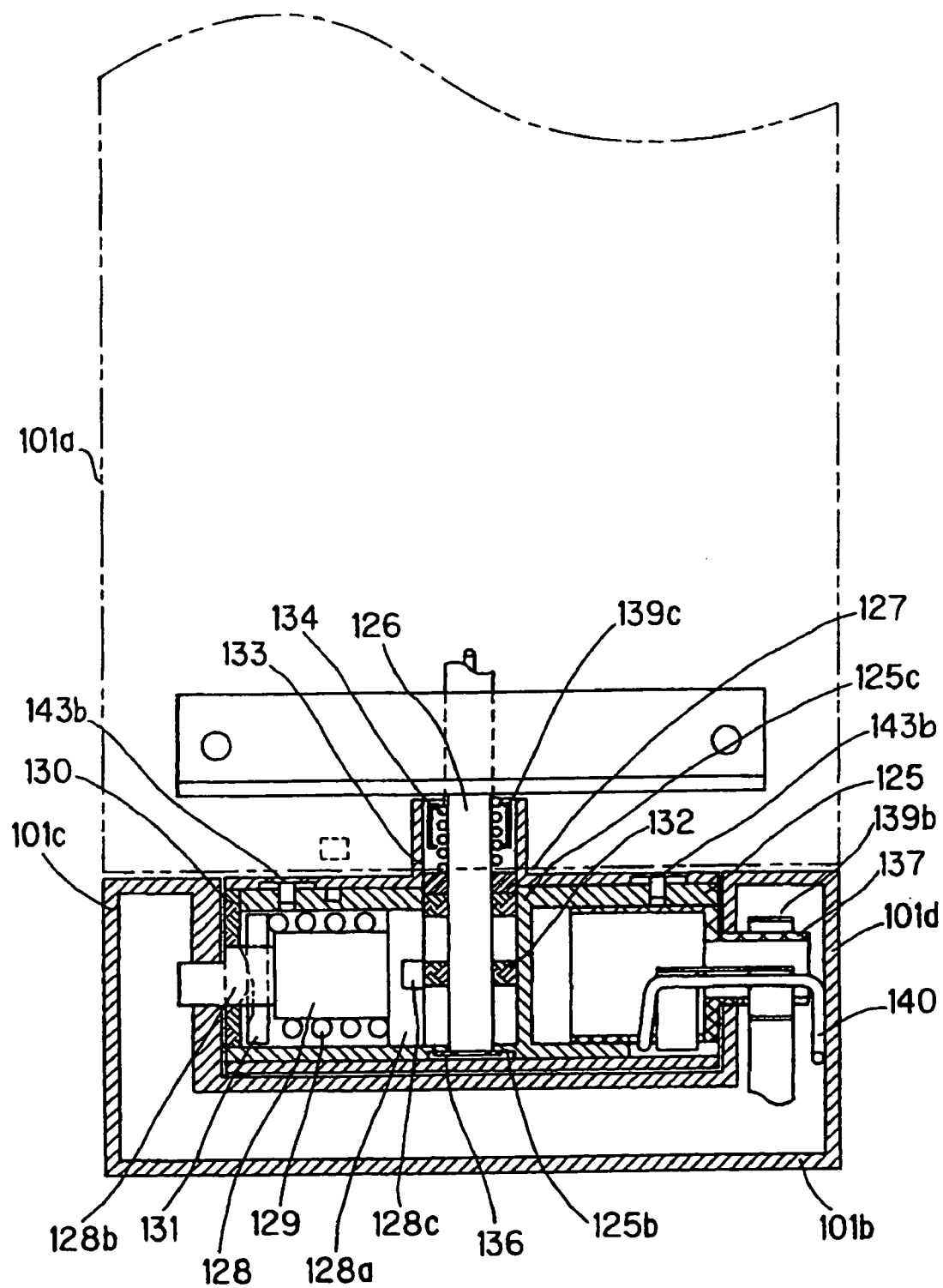
FIG. 11 is a sectional view of the hinge in the first opened state.
Figure 12:
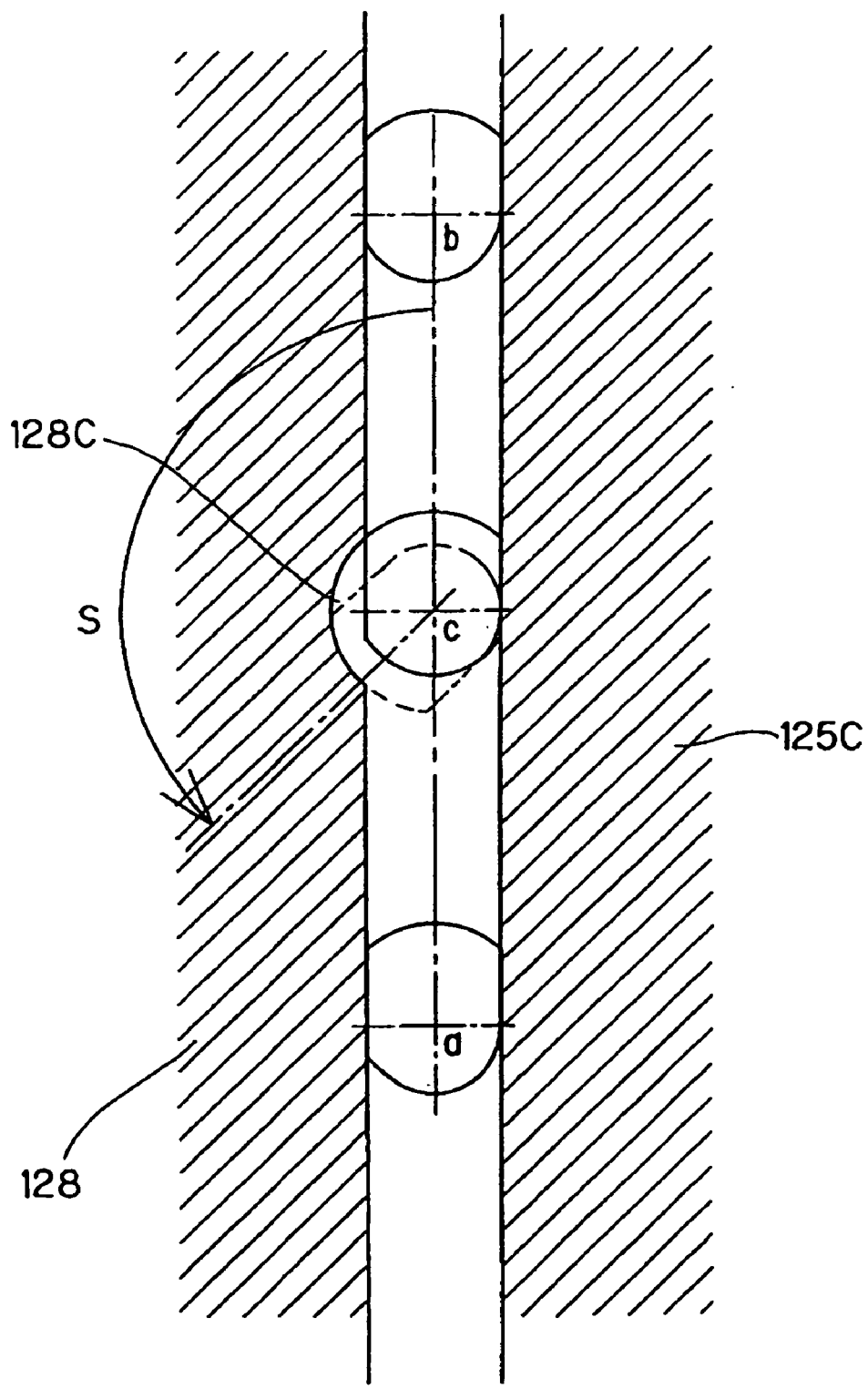
FIG. 12 is an explanatory diagram (cam diagram) of the operation of a cam attached to the hinge.

Next, the hinge portion 102 is detailed below referring to FIGS. 9 through 12. FIG. 9 is an exploded perspective view of the casing 101 of the foldable communication terminal according to this embodiment. FIG. 10 is an exploded perspective view of the hinge of the foldable communication terminal according to this embodiment. FIG. 11 is a sectional view of the hinge portion 102 in the first opened state. FIG. 12 is an explanatory diagram (cam diagram) of the operation of a cam attached to the hinge portion 102.

As shown in FIGS. 9 through 11, the hinge portion 102 of the communication terminal according to this embodiment includes; a hinge unit 138 including a first rotation axis 125, a second rotation axis 126, a support plate 127, a guide axis 128, a first coil spring 129, a first click convex plate 130, a cam 132, a second click convex plate 133, a second coil spring 134, a bracket 135, an E-ring 136, and a first rotation axis bearing 137; a flexible board 139; a cable 140; a front cover 141; a rear cover 142; and tightening screws 143a, 143b. Among the components of the hinge unit 138, only the first rotation axis bearing 137 is formed of a resin material. The other components are formed of a conductive metal material. A sliding resistance reducing member formed of a material such as a polyacetal resin may be inserted on a sliding portion as required.

The first hollow rotation axis 125 includes in the center, a notch 125a, a support 125b for supporting the second rotation axis 126, a partition 125c, a slit 125d, a screw hole 125e, and a second permanent magnet 125f. On the notch 125a is provided a support plate 127. On the support plate 127 are formed a convex portion 127a and a support hole 127b for supporting the second rotation axis 126. Inside the first rotation axis 125 attached a guide axis 128, a first coil spring 129, a first click convex plate 130 and a first click concave plate, from left to right in FIG. 10.

The guide axis 128 includes a large diameter portion 128a and a small diameter portion 128b. In the large diameter portion 128a is formed a parallel groove 128c. At the tip of the small diameter portion 128b is formed a D-cut portion 128d. The first click convex plate 130 cannot rotate about the guide axis 128b and is provided so as to be movable only in the thrust direction of the small diameter portion 128b. To the first click concave plate 131 is inserted the small diameter portion 128b in a rotatable fashion and the first click concave plate 131 is fixed to the end of the first rotation axis 125.

The first coil spring 129 forces the first click convex plate 130 toward the first click concave plate 131. While the casing 101 is in the closed state or in the first opened state, the convex portion 130a of the first click convex plate 130 engages the concave portion 131a of the first click concave plate 131. In case the casing 101 is placed into the closed state from the first opened state, engagement between the convex portion 130a and the concave portion 131a is released. In case the casing 101 is placed into the first opened state, the convex portion 130a engages the concave portion 131a. This gives the user a click feel at the engagement/release of engagement between the convex portion 130a and the concave portion 131a.

To the second rotation axis are attached a cam 132, a support plate 127, a second click convex plate 133, a second coil spring 134 and a bracket 135, from top to bottom in the middle of FIG. 10. The second rotation axis 126 is supported by a support plate 127 attached to the notch 125a in the first rotation axis 125 and a support portion 125b of the first rotation axis 125. At the tip of the second rotation axis 125 is provided an E-ring 136, which is held rotatably about the first rotation axis 125. The second click convex plate 133 is provided so as to be movable only in the thrust direction of the second rotation axis 126. The second coil spring 134 forces the second click convex plate 133 toward the support plate 127.

Until the casing 101 is placed in the first opened state from the closed state via the second opened state, or only in case the casing 101 is in the third opened state, the convex portion 133a of the second click convex plate 133 engages the concave portion 127a of the support plate 127. When the casing 101 shifts from the second opened state to the third opened state, engagement between the convex portion 133a of the second click convex plate 122 and the concave portion 127a of the support portion 127 is released and engagement is reestablished in the third opened state. This configuration, same as the aforementioned configuration of the convex portion 130a of the first click convex plate 130 and the concave portion 131a of the first click concave plate 131, gives the user a click feel.

In the bracket 135 is formed a hole 135a used to fix the bracket 135 to the first casing member 101 a together with the first printed board 116a by way of the tightening screw 143a. In this embodiment, the bracket 135 is insulated from the first printed board 116a. With this configuration, the hinge unit 138 is insulated from the printed boards 116a, 116b of the first and second casing members 101a, 101b, and insulated from the first casing member 101a and the second casing member 101b. Conversely, in case the hinge unit 138 is to be grounded to the first printed board 116a, a grounding pattern may be formed on the first printed board 116a which abuts the bracket 135. When wishing to electrically connect the hinge unit 138 to the first casing member 101a without the first printed board 116a, for example, the outer jacket of the first casing member 101a may be formed from a metal material having a conductivity, such as an aluminum ally or a magnesium alloy by way of a die-casting method and the hinge unit 138 may be connected thereto.

The clearance L between the first printed bard 116*a* as a conductor on the first casing member 101*a* and the second printed bard 116*b* as a conductor on the second casing member 101*b* is set to approximately λ/10 (15 mm) assuming that the wavelength λ in the 1 GHz band is 150 mm. This provides capacity coupling between the first casing member 101*a* and second casing member 101*b* with a high impedance provided between them. The clearance L is preferably narrower for capacity coupling between them.

The cam 132 is housed in the first rotation axis 125 while fixed to the second rotation axis 126 and sandwiched between the partition 125*c* of the first rotation axis 125 and the large diameter portion 128*a* of the guide axis 128. The cam 132 crosses the parallel groove 128*c* except in the second opened state as the casing 101 is placed into the first opened state from the closed state, and is in parallel with the parallel groove 128*c* in the second opened state. In the second opened state, the cam which rotates in accordance with the rotation of the second rotation axis 125 can be guided into the parallel groove 128*c*, so that it is possible to rotate the first casing member 101*a* in the direction of S. The above operation is described below referring to the cam diagram of FIG. 12.

In the cam diagram of FIG. 12, the shaded area on the right shows a partition 125*c*. The shaded area on the left shows a large diameter portion 128*a* of a guide axis 128. The position of the cam 132 assumed when the casing 101 is in the closed state is shown with a position a. The position of the cam 132 assumed when the casing 101 is in the first opened state is shown with a position b. The position of the cam 132 assumed when the casing 101 is in the second opened state is shown with a position c.

At the positions a, b, the right and left end faces of the cam are respectively surrounded by the partitions 125*c* and the large diameter portion 128*a* of the guide axis 128, so that the cam 132 cannot rotate. At the position c, the partition 125*c* is on the side of the right end face of the cam 132, so that the cam 132 cannot rotate in the opposite direction to S. On the side of the left end face of the cam 132 is the parallel groove 128*c*, s that the cam 132 can rotate in the direction of S by 150 degrees. Where the cam 132 has rotated in the direction S by 150 degrees, part of the cam 312 is in the parallel groove 128*c*. In this state, the board thickness direction of the cam 132 is surrounded by the parallel groove 128*c* so that the casing. 101 is inhibited to change into the closed state or first opened state.

In a case that the casing 101 performs opening/closing operation between the closed state and the first opened state, the first casing member 101*a* cannot rotate in the direction of S or in the direction opposite to S, except in the second opened state. In the second opened state, the casing 101 cannot rotate in the direction opposite to S but can rotate in the direction of S by 150 degrees. Further, between the second opened state and the third opened state, the first rotation axis 125 cannot rotate and the casing cannot be opened/closed. The ridge of the first casing member 101*a* abuts the main face 101*g* of the second casing member 101*b* so as to avoid any damage.

Inside the first rotation axis 125 is attached a first hollow rotation axis bearing 137 from right in the middle of FIG. 10. The groove 237*a* of the first rotation axis bearing 137 is attached in the same direction as the slit 125*d*.

To the hinge unit 138 are assembled a flexible board 139 and a cable 140. The flexible board 139 including a corner 139*a* electrically connects the first casing member 101*a* and the second casing member 101*b*. One end of the corner 139*a* is wound about the first rotation axis bearing 137 to form a first winding portion 139*b*. The corner 139*a* is passed from the groove 137*a* into the first rotation axis bearing 137. The other end of the corner 139*a* is passes through the slit 125*d* to go out of the first rotation axis 125 to be wound about the first rotation axis 125 about a half turn and wound about the second rotation axis 126 to form a second winding portion 139*c*, which is connected to the first casing member 101*a*.

A cable 140 for electrically connecting the first antenna 103*a* provided in the first casing member 101*a* and the transceiver 117 provided in the second casing member 101*b* is passed from the end of the first rotation axis 137 through the first rotation axis bearing 137, exist from the slit 125*d* and extends toward the first casing member 101*a*, and is connected to the first antenna 103*a* via the inside of the second winding portion 139*c*.

After the flexible board 139 and the cable 140 are assembled onto the hinge unit 138, a front cover 141 and a rear cover 142 as exterior components are fixed with a tightening screw 143*b*. On the front cover 141 and the rear cover 142 are respectively provided engaging claws 141*a*, 142*a* and screw through holes 141*b*, 142*b*. The screw through holes 141*b*, 142*b* are provided so that they will face the bracket 134 provided on the second rotation axis 126. The front cover 141 and the rear cover 142 engage the engaging claws 141*a*, 142*a* while surrounding to sandwich the hinge unit 138. The tightening screw 143*b* is fixed into the screw hole 125*e* of the first rotation axis 125 via the screw through holes 141*b*, 142*b*. This configuration complete the hinge portion 102.

The D-cut portion 128*d* formed at the tip of the small diameter portion 128*b* is supported by the D-shaped hole 101*e* provided in the hinge mounting portion 101*c* of the second casing member 101*b*. The rim of the first rotation axis bearing 137 is supported by the bearing 101*f* of the hinge mounting portion 101*d* of the second casing member 101*b* and the hinge portion 102 is mounted on the second casing member 101*b*. To the bracket 135 is attached the first casing member 101*a*.

Figure 13:
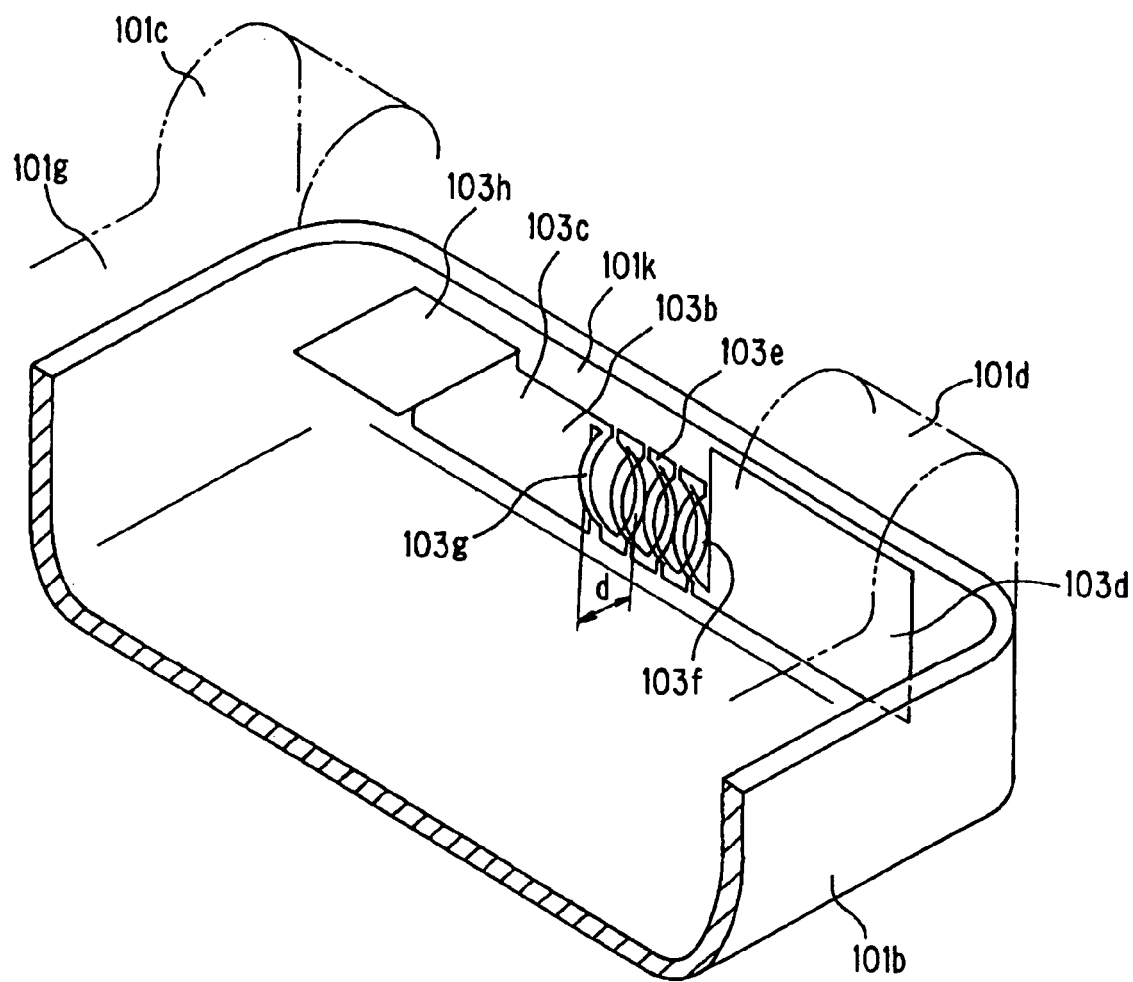
FIG. 13 is a perspective view of a second antenna provided on the communication terminal according to the embodiment.

Next, the configuration of a second antenna is detailed below referring to drawings. FIG. 13 is a perspective view of a second antenna 103*b* provided on the communication terminal according to this embodiment. In FIG. 13, the second antenna 103*b* is adhered to the internal face 101*k* of a side in the proximity to the hinge mounting portions 101*c*, 101*d* which is adjacent to the main face 101*g* of the second casing member 101*b* and is opposed in close proximity to the first casing member 101*a* when the casing 101 is in the first opened state. The second antenna 103*b* includes a first element 103*c*, a second element 103*d*, and a reactance portion 103*e* arranged between the first and second elements 103*c*, 103*d*. The second antenna 103*b* is formed by way of press working.

Figure 14:
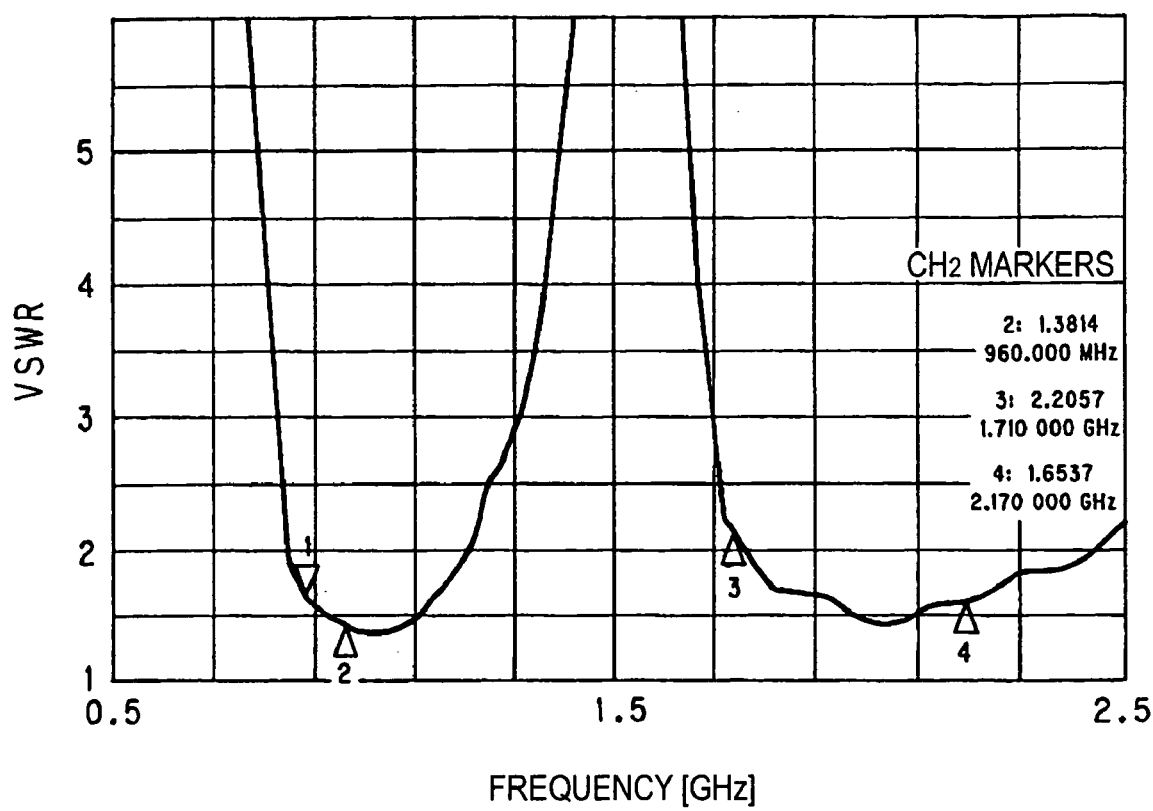
FIG. 14 is a characteristics plot showing the VSWR characteristic of a second antenna provided on the communication terminal according to this embodiment.

The electricity length of the first element 103*c* is formed so as to reach ¼ of the wavelength λ1 of a frequency of approximately 1.9 GHz. The electricity length of the second element 103*d* is formed so that the sum of the electricity length of the second element and that of the first element obtained when one end of each of the first and second elements 103*c*, 103*d* are connected by the reactance portion 103*e* will be ¼ (or ⅜) of the wavelength λ2 of a frequency of 900 MHz. The reactance portion 103*e* is formed so that the step height between the equidistant concave portion 103*f* and convex portion 103*g* will reach approximately d. The power feeding portion 103*h* provided at the other end of the first element 103*c* is forced by a probe-type pin connector 116c surface-mounted on the left corner of the second printed board 116b to be electrically connected to the second printed board 116b, as shown in FIG. 7. The power feeding portion 103h is arranged apart from the flexible board 139 housed in the hinge mounting portion 101d. By connecting the first and second elements 103c, 103d by way of the reactance portion 103e, it is possible to implement a multifrequency antenna having a plurality of resonance points. FIG. 14 shows the VSWR characteristic of the second antenna 103b. The characteristic plot shows measured data of VSWR in the frequency range of 0.5 to 2.5 GHz.

The communication terminal according to this embodiment may be used by the user with the receiving portion 106 at the ear in the first opened state, or hands-free. In case the user reads an e-mail or enters characters, the user holds in his/her hand the communication terminal so as to orient the first operating portion 105a and the first display portion 112 to the user, as shown in FIG. 5. The speaker 107 is not covered by the user's right hand or left hand, thus the user hears clear voice from the speaker 107.

As shown in FIG. 6, the user holds the communication terminal so as to orient the second operating portion 105b and the first display portion 112a to the user in the third opened state. In this case, the first display portion 112 is best viewed in front of the user so that the user holds the second casing member 101b in his/her right hand. In this practice, the loudspeaker is not covered by the right hand, thus the user hears clear voice from the speaker 107.

Figure 15:
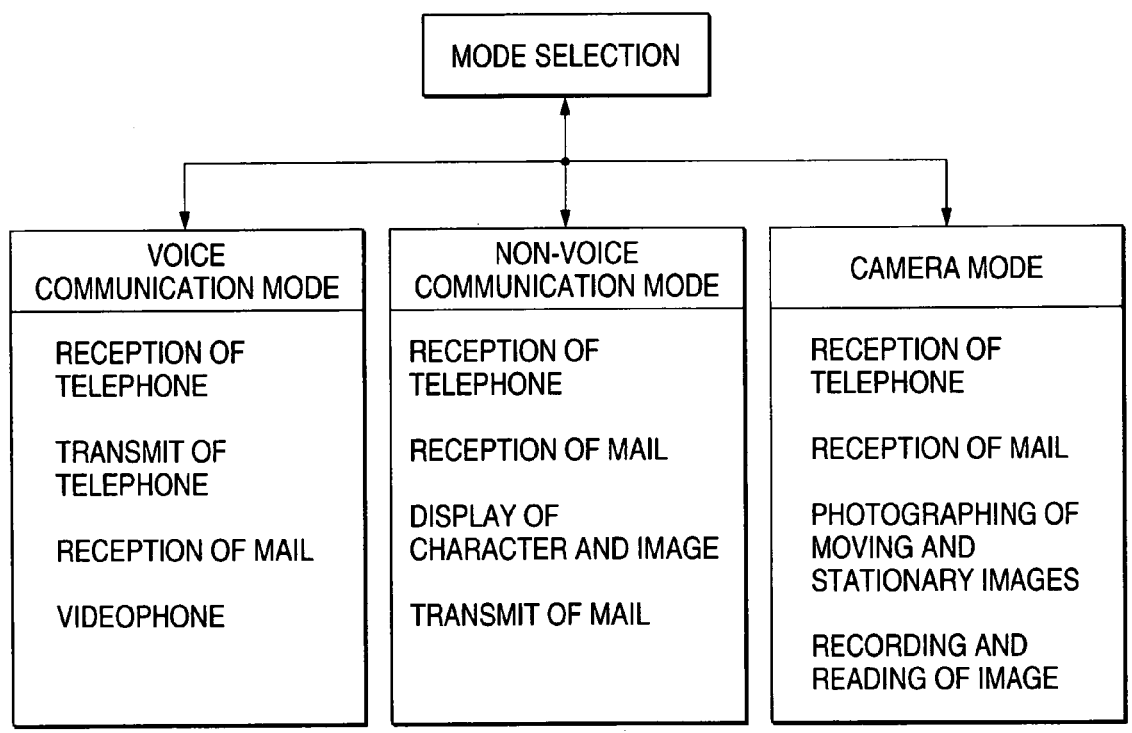
FIG. 15 is an explanatory drawing of the features of the communication terminal according to the embodiment.

Operation of the communication terminal according to this embodiment will be described referring to FIGS. 1 through 15. FIG. 15 illustrates the mode-based features of the communication terminal according to this embodiment. As shown in FIG. 15, when the power is supplied to the communication terminal according to this embodiment, the vice communications mode starts. The user can manipulate the operating portion 105 to toggle between modes and perform each feature in the non-voice communications mode or camera mode.

In the voice communications mode, the communication terminal starts the standby operation of voice and non-voice communications. The user can talk with a distant party by answering an incoming voice call or originating a voice call. In the standby state, information such as the current time is displayed on the second display portion while the casing 101 is in the closed state and on the first display portion 112 while in the opened state. On call termination, the time display disappears and the originating number of the distant party is displayed. In case the originating number of the distant party is registered to the directory together with his/her name, the distant party's name is displayed. After that, the user manipulates the operating portion to start conversation.

In the non-voice communications mode, while maintaining the standby state, the user displays text information entered from the operating portion 105 on the first display portion 112 as well as transmits to the distant party the text information and voice/non-voice (such as image) information stored in the information recording portion 121 by using the transmission feature.

In case the text information or voice/non-voice information is received while the casing 101 is opened, a message notifying reception of the information is displayed on the first display portion 112. In case the ii is received while the casing 101 is closed, a message notifying reception of the information is displayed on the second display portion 113. With a predetermined operation by the user, text information and image information can be displayed on the first and second display portions 112, 113. For voice or non-voice communications, the directory feature is made available in order to specify the distant party. The user displays candidate distant party's names on the first display portion 112 by using the directory feature for selection and specification of the distant party.

In the camera mode, photographing using the camera portion 109 may be made in the opened state. For example, in the third opened state, when the user himself/herself on the side of the first display portion 112 is photographed using the first camera portion 109a, a mirror image of the user is displayed on the first display portion 112, which state is similar to looking into a mirror. When the user operates the second camera portion 109b to photograph a person ahead (subject), a mirror image is displayed on the first display portion 113 and a reversed mirror image is displayed on the first display portion 112. Thus, a person ahead as a subject can check how he/she is photographed by watching the second display portion 113. The user as a photographer watches the photographed image displayed on the first display portion 112 to check how the subject is photographed.

To start or end photographing or use the zoom feature, the user can manipulate the second operating portion 105b to perform necessary operations. When wishing not to allow the subject ahead to watch a photographed image, the user can manipulate the operating portion 105 to hide a photographed image displayed on the second display portion 113 in the third opened state. A photographed image can be recorded into the information recording portion 121 as a still image or moving image. To reproduce a moving image or a still image recorded in the information recording portion 121, the user performs a predetermined operation to display a photographed image on the first display portion 112 and visually check the image. The photographed image can be stored into a director in association with telephone number information. On call termination from a telephone number associated with the image information, the reversed mirror image of the photographed image is displayed on the second display portion 113 when the casing 101 is in the closed state, and on the first or second display portion 112, 113 when the casing 101 is in the opened state. To be more precise, even in case a mirror image is not displayed at the time of photographing, a reversed mirror image is displayed when the recorded image is reproduced. It is possible to transmit an image photographed with the camera portion 109 to a distant party.

In any mode, the user is notified on call termination by way of a ringing tone from the speaker 107. Even in case the casing 101 is in the closed state, the ringing tone output from the speaker 107 is guided outside the casing 101 via the clearance 123b between the first casing member 101a and the second casing member 101b, so that the user hear a clear ringing tone. When the casing 101 is in the opened state, the front side of the loudspeaker is open so that the user has no difficulty in hearing the ringing tone. In case the communication terminal is set to the manner mode, the ringing tone is not output but the vibrator portion 104 operates to vibrate the casing 101 for a predetermined period.

Rotation of the casing 101 is described below.

As the casing 101 in the closed state is opened, the casing 101 rotates about the first rotation axis 125. The number of turns of the first winding portion 139b of the flexible board 139 decreases by the number of rotations of the first rotation axis bearing 137 which rotates with the first rotation axis 125. This reduces the bending stress on the flexible board 139. The cable 140 is arranged approximately at the same position as the center of the first rotation axis 125. Thus the bending stress remains unchanged and only the torsion stress is generated. When the casing 101 returns to the closed state from the first opened state, the operation from the closed state to the opened state is reversed.

When the first casing member 101a is rotated in the direction of S by 90 degrees and the casing 101 is placed into the third opened state from the second opened state, the number of turns of the second winding portion 139c of the flexible board 139 is increased/decreased in accordance with the number of rotations of the second rotation axis. The flexible board 139 only increases/decreases the number of turns of winding, so that only the bending stress is increased/decreased and the torsion stress is not generated. The cable 140 is wound around the second rotation axis 126 by the distance the first rotating had rotated. However, the second rotation axis has a smaller diameter than the first rotation axis 125. Thus the curvature radius when wound is smaller to avoid a large bending stress.

The flexible board 139 forms the first and second winding portions 139b, 139c about the center of the first and second rotation axes 125, 126. Thus, even when the first and second rotation axes 125, 126 rotate, only the curvature and number of turns change. Thus, the pulling or warp of the flexible board 139 in rotation is absorbed by the first and second winding portion 139b, 139c. Thus, only the bending stress changes and the torsion stress is not generated.

When the casing 101 is in the closed state, first opened state or second opened state, the head of the tightening screw 143b is opposed to the first casing member 101a so that the tightening screw 143b is concealed by the first casing member 101a. Only when the casing 101 is rotating from the second opened state to the third opened state, the head of the tightening screw 143b is exposed. However, the head of the tightening screw 143b is exposed only in the third opened state, so that it is possible to reduce the chances of the head of the tightening screw 143b being exposed.

Even in case a photographed moving image is reproduced or in case the communication terminal according to this embodiment is used as a videophone, the user does not cover the speaker 107 with his/her hand so that the user hear a clear voice reproduced from the speaker 107. The user does not cover the microphone 108 either when using the communication terminal as a videophone, the user equally hears a clear voice of the distant party output from the speaker 107 and speaks into the microphone without failure.

While the protrusion 123a to form a clearance 123b between the first casing member 101a and the second casing member 101b when the casing 101 is in the closed state is formed on the surface of the second casing member 101b in this embodiment, a similar protrusion may be provided elsewhere, such as on the first casing member 101a. Other means may be used, such as protruding a cover member to conceal the tightening screw 143 for tightening the first casing member 101a from the surface of the first casing member 101a. That is, in order to guide a voice output from the speaker 107 outside the casing 101 even when the casing 101 is in the closed state, the clearance 123b should be formed between the casing member where the speaker 107 is arranged and the opposed casing member.

Figure 17:
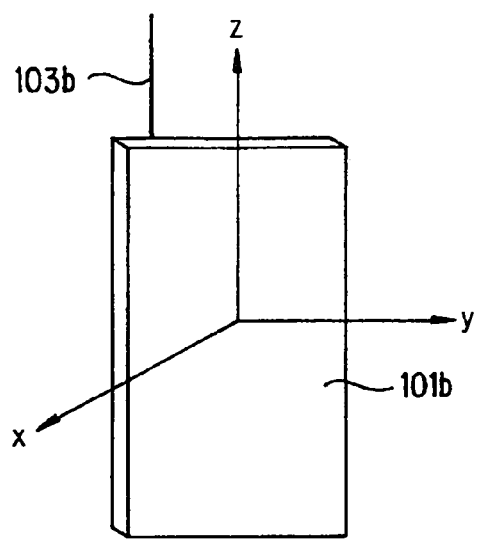
FIG. 17 shows a directional pattern of the second antenna used for the communication terminal, (a) showing xyz axes with respect to a casing, (b) showing in an opened state (first and third opened states), and (c) showing in a closed state.
Figure 17:
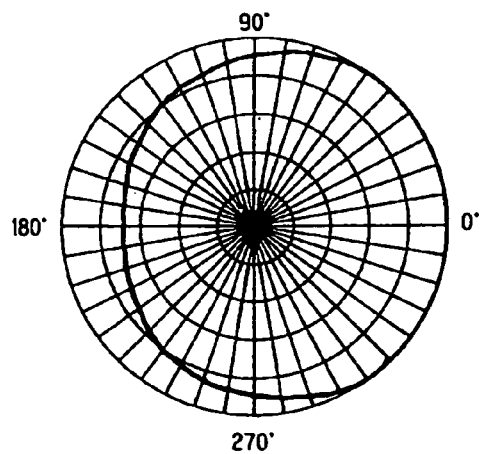
Figure 17:
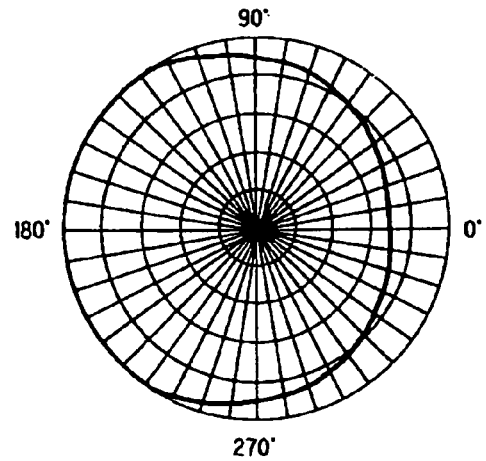

Next, operation of the second antenna 103b is described below. FIG. 16 illustrates the operation principle of the second antenna 103b used for the communication terminal according to this embodiment in a closed state. FIG. 16(a) shows the closed state of the casing. FIG. 16(b) shows the first opened state of the casing. FIG. 17A shows the xyz axes with respect to the casing of the communication terminal.

FIG. 17B shows the directional pattern of the second antenna 103b in FIG. 16 in the opened state of the casing (first and third opened states). FIG. 17C shows the directional pattern of the second antenna 103b in the closed state of the casing.

In FIG. 16, the first casing member 101a is connected to the second casing member 101b having the second antenna 103b by way of capacity coupling (stray capacitances) and is insulated in terms of DC. The first casing member 101a operates as a reflector when the two casing members 101a, 101b are in the closed state while operates as a waveguide in the first opened state. In the closed state shown in FIG. 16(a), the direction of the high-frequency currents (casing currents) flowing through the first and second casing members 101a, 101b are shown by arrows A and B and the magnitude of the current is greater on the side of the second casing member 101b.

In the first opened state shown in FIG. 16(b), the magnitude of the high-frequency current flowing through the first casing member 101a is substantially equal to that of the high-frequency current flowing through the second casing member 101b but the direction of the current has an opposite phase. In this case, as shown by the arrow C, the direction of the high-frequency current is reversed with respect to the arrow B. The direction of the high-frequency current flowing into the second casing member 101b shown by the arrow D is the same as the arrow A. Thus, in the first opened state, an electromagnetic wave is irradiated from the first casing member 101a as well.

In the third opened state shown in FIG. 16(c), the high-frequency current (arrow E) flowing through the second casing member 101b is the same as the high-frequency current (arrow A) flowing through the second casing member 101b in the closed state. The first casing member 101a crosses the second casing member 101b so that the first casing member 101a does not operate as a waveguide but similarly to the closed state. The direction of the high-frequency current (arrow F) flowing through the first casing member 101a is approximately orthogonal to the high-frequency current (arrow E) flowing through the second casing member 101b. The casing current (arrow F) on the side of the first casing member 101a does not cancel the casing current (arrow E) on the side of the second casing member 101b. Thus, the gain of the second antenna 103b is not reduced. An electromagnetic wave is irradiated from the second casing member 101b as well as from the first casing member 101a.

While the second antenna 103b is arranged along the first rotation axis 125 of the hinge unit 138, it may be arranged elsewhere. For example, the second antenna 103b may be arranged so as to extend the end of the second antenna (opposite to the power feeding portion side) in a direction away from the hinge portion 102, that is, from the hinge portion 102 to the battery (end of the second casing member 101b). Even in case a protruding antenna is provided in close proximity to the hinge, placing the first and second casing members in loose coupling reduces the drop in the antenna gain while the casing is held in the user's hand, since the first casing member operates as a radiator and a waveguide as mentioned earlier. That is, an electromagnetic wave is irradiated from the first casing member as well, so that the antenna shape may be a plate or a rod.

Figure 18:
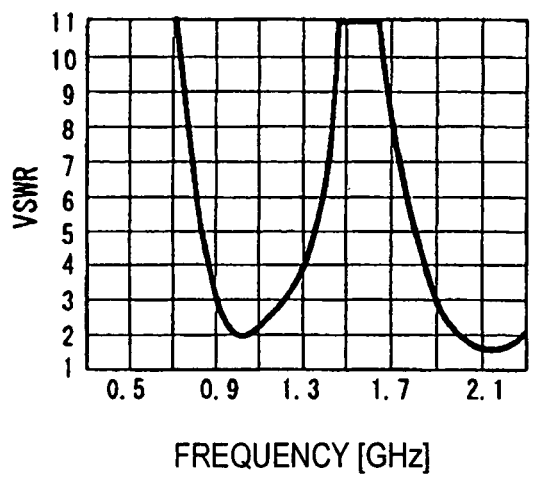
FIG. 18 shows the VSWR characteristic of the second antenna and the impedance characteristic in a case that the first and second casing members are tight coupled, (a) and (b) showing in closed states, and (c) showing in a first opened state.
Figure 18:
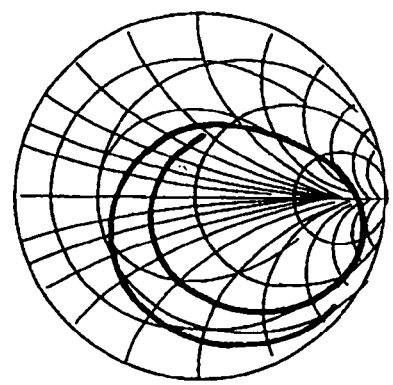
Figure 18:
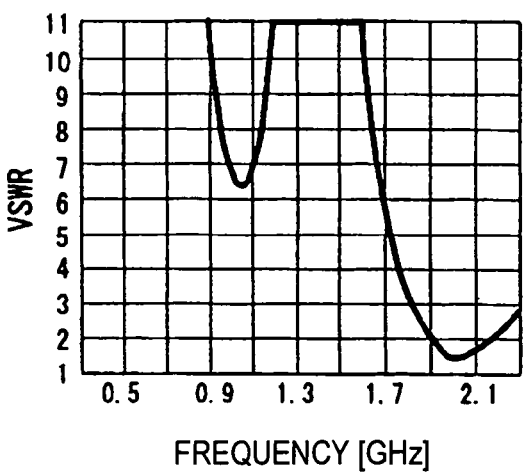
Figure 18:
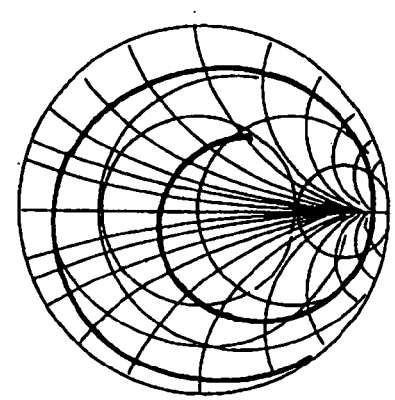

The VSWR characteristic and impedance characteristic of the second antenna with the first and second casing members in tight coupling will be described referring to FIG. 18. In FIG. 18, (a) and (b) respectively show the simulation results of the VSWR characteristic and impedance characteristic of the second antenna with the first and second casing members in tight coupling in the closed state. In FIG. 18, (c) and (d) respectively show the simulation results of the VSWR characteristic and impedance characteristic of the second antenna with the first and second casing members in tight coupling in the opened state. When the VSWR characteristics in two states (a) and (c) in tight coupling are compared with each other, in a case that the casing 101 is placed into the first opened state from the closed state, VSWR shows a negligible change around the 2 GHz band but a drop on the lower spectrum (around 0.9 GHz). This is because, at a higher frequency, a current flowing into the antenna is large and a casing current is small, while at a lower frequency, a current flowing into the antenna is small and a casing current is large. The effect of the opposite-phase current flowing through the first casing member 101a greatly contributes to the lower frequencies. From this result, it is understood that the first casing member 101a and the second casing member 101b should be placed in loose coupling especially when a multifrequency antenna is used.

In other words, when the first casing member 101a and the second casing member 101b are in tight electric coupling, the irradiation characteristic in the lower resonance frequency band is degraded. Thus, when a multifrequency antenna is used, two casing members 101a, 101b should be placed in loose coupling to obtain a favorable antenna gain.

As shown in FIG. 5, in the first opened state, the user holds the second casing member 101b in his/her hand and places the receiving portion 106 of the first casing member 101a at his/her ear to talk with the distant party. In the videophone mode, the user uses the first casing member 101a away from the head. When the user photographs a subject ahead the user holds the second casing member 101b in the second opened state in his/her hand. In the first opened state, the first casing member 101a to irradiate an electromagnetic wave is not covered by the user's hand so that a drop in the antenna gain is avoided to perform favorable communications. In the third opened state, same as the closed state, the side of the second casing member 101b where the second antenna 103b is provided and the first casing member 101a are not covered by the user's hand so that it is possible to reduce the gain caused when the casing is held by the user's hand.

In case the power feeding portion 103h where the maximum current is produced is brought in close proximity to the first winding portion 139b of the flexible board 139, when the casing 101 has changed from the closed state to opened state, the curvature of the first winding portion 139b changes so that the clearance between the two components becomes narrower, which invites capacity coupling of the flexible board 139 and the power feeding portion 103h of the second antenna 103b. Thus the frequency response in the lower frequency band shows a narrowband irradiation characteristic. When the power feeding portion 103h is in close proximity to the flexible board 139, a current flows into the first casing member 101a from a point near the power feeding portion 103h, so that the casing current on the side of the first casing member 101a is in opposite phase with the casing current on the side of the second casing member 101b. In this embodiment, the flexible board 139 is placed apart from the power feeding portion 103h and the end where the antenna current is approximately zero (end of the second element 103d) is brought in close proximity to the first winding portion 139b. With this configuration, even in case the casing 101 unfolds/folds, the first winding portion 139b and the second antenna 101b are not placed in capacity coupling. This prevents narrowband irradiation characteristic and prevents the casing current on the side of the first casing member 101a from being in opposite phase. That is, it is possible to control the casing current so that the casing current on the side of the first casing member 101a will be in phase with that on the side of the second casing member 101b. It is thus possible to avoid a drop in the gain of the second antenna 103 irrespective of whether the casing 101 is opened or closed.

Figure 19:
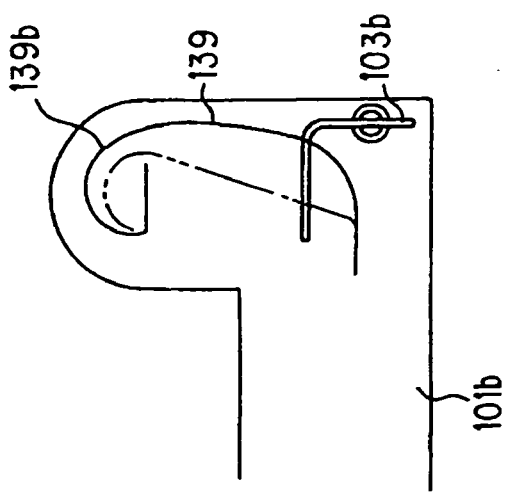
FIG. 19 illustrates the degree of deformation of a flexible board in accordance with the opening/closing operation of the casings of the communication terminal, (a) showing the casings in a closed state, (b) showing in a opened state, and (c) showing in a first opened state.
Figure 19:
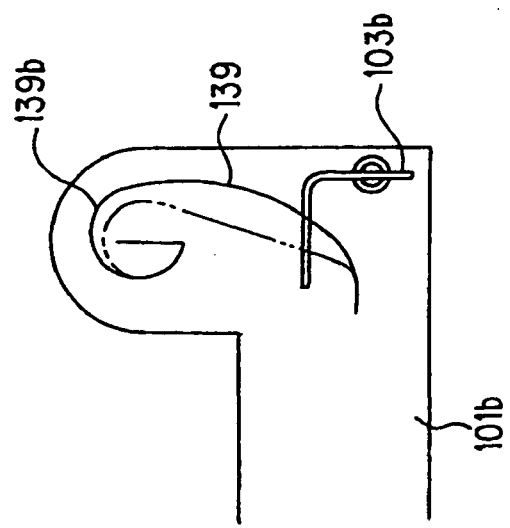
Figure 19:
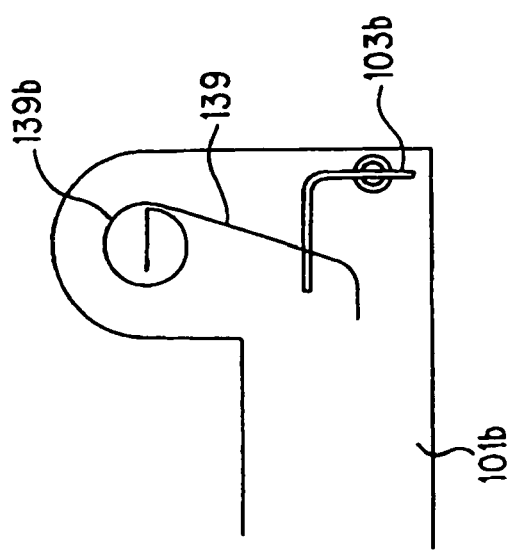
Figure 20:
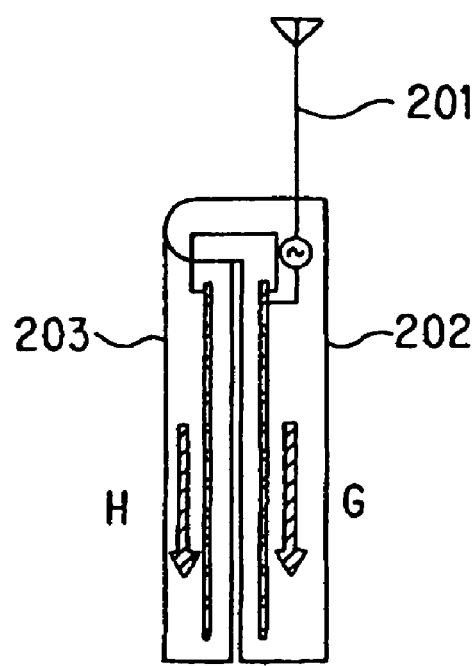
FIG. 20 illustrates the structure of the prior art communication terminal and operation principle of its antenna, (a) showing in a closed state and (b) showing a opened state.
Figure 20:
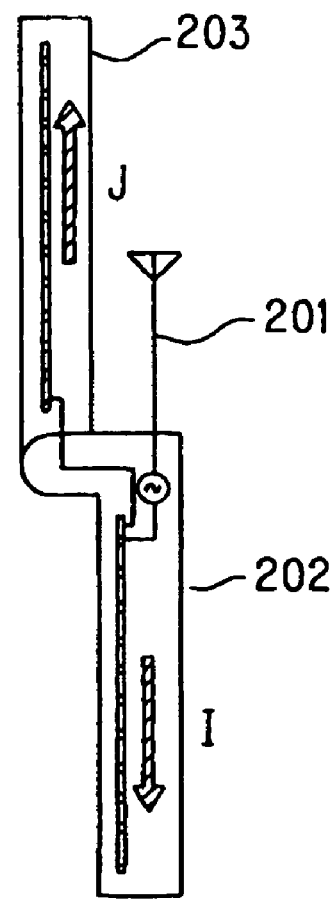

The degree of deformation of the flexible board 139 which accompanies the opening/closing operation of the casing 101 will be described referring to FIG. 19. In FIG. 19, (a) shows the closed state of the casing, (b) shows the third opened state of the casing and (c) shows the first opened state of the casing. In the closed state shown in FIG. 19(a), the flexible board 139 is arranged downward from the first winding portion 139b. In the state where the casing 101 show in FIG. 19(b) is opened by 90 degrees, the third (or second) opened state, the number of turns of the first winding portion 139b is reduced by ¾ of the circumference, thus the curvature of the first winding portion 139b increases and the flexible board 139 approaches the second antenna 103b. In the first opened state shown in FIG. 19(c), the ratio of the change in the curvature of the first winding portion 139b further increases and the flexible board 139 further approaches the second antenna 103b. Thus, when the casing 101 is changed from the closed state to the first opened state, the curvature of the first winding portion 139b changes and the winding aspect inflates, which narrows the clearance between the flexible board 139 and the second antenna 103b, thereby inviting a drop in the gain of the second antenna 103b. Therefore, the power feeding portion 103h is preferably placed apart from the first winding portion 139b as in this embodiment, in order to obtain a better antenna performance.

In this way, according to this embodiment, in a foldable communication terminal including a flexible board placed in a hinge, the flexible board is placed apart from the antenna power feeding portion even in case the flexible conductor is arranged in close proximity to the antenna. This configuration avoids a drop in the antenna gain caused by the flexible conductor. It is thus possible to suppress degradation of an antenna gain irrespective of whether the casing is in the closed state or opened state. It is possible to provide a foldable communication terminal including a flexible board which promises a longer service life of the flexible board and allows a built-in antenna structure.

While the invention has been described in details and in terms of specific embodiments, those skilled in the art will recognize that various changes and modifications can be made in it without departing from the spirit and scope thereof.

The invention is based on the Japanese Patent Application No. 2002-296519 filed Oct. 9, 2002, the contents of which are incorporated herein by reference.

INDUSTRIAL APPLICABILITY

As mentioned hereinabove, the invention provides a communication terminal capable of suppressing degradation of an antenna gain irrespective of whether the casing of the communication terminal is opened or closed.

The invention claimed is:
1. A communication terminal, comprising:
a first casing member, which contains a first printed circuit board having a conductive portion;

a second casing member, which contains a second printed circuit board having a conductive portion;

a hinge portion, which connects the first casing member to the second casing member so as to freely open and close; and an antenna, which is provided in the second casing member;

wherein the hinge portion includes a first rotating member formed by conductive material and a second rotating member formed by the conductive material:

wherein the first rotating member serves as an axis for rotating the first casing member and the second casing member in an opposed direction of the first and second casing members;

wherein the second rotating member has a first end portion rotatably supported on the first rotating member at right angles to each other and a second end portion away from the first rotating member;

wherein the second rotating member serves as an axis for rotating one casing member of the first and second casing members relative to the other casing member of the first and second casing members in a direction perpendicular to the rotating direction in which the first rotating member serves as the axis under a non-opposed state of the first and second casing members;

wherein the first casing member holds the second end portion of the second rotating member;

wherein the second casing member holds both end portions of the first rotating member;

wherein the antenna is provided along in an axis direction of the first rotating member;

wherein an end portion of the antenna which is arranged at one end side of the first rotating member is connected to a power feeding portion provided on the second printed circuit board;

wherein the second printed circuit board is electrically coupled with the first printed circuit board which is separated with a predetermined interval from the second printed circuit board; and wherein the second printed circuit board is separated from the first rotating member and the second printed circuit board is isolated in direct current at an area near to the both end portions of the first rotating member.

2. The communication terminal according to claim 1, wherein a flexible conductor is disposed along a vicinity of a center of axis of the first rotating member and a vicinity of a center of axis of the second rotating member;

wherein the flexible conductor is extended to the first casing member side through the one end side of the first rotating member; and wherein the flexible conductor is extended to the second casing member side through the other end side of the second rotating member.

3. The communication terminal according to claim 1 or claim 2, wherein a flexible conductor is extended along an axis direction of the second rotating member and extended along the axis direction of the first rotating member from a cross portion of the axes of the first and second rotating members to the other end side of the first rotating member; and wherein the flexible conductor electrically connects the first printed circuit board to the second printer circuit board.

4. The communication terminal according to claim 3, wherein a winding portion is formed on the flexible conductor disposed in the one end side of the first rotating member.

5. The communication terminal according to claim 4, wherein a cable which electrically connects the antenna to a transceiver portion provided on the second printed circuit board provided; and wherein the cable is inserted into the winding portion.

6. The communication terminal according to claim 1, wherein the antenna is extended from the one end side to the other end side of the first rotating member.

7. The communication terminal according to claim 1, wherein the antenna has a first element part having a first electric length and second element part having a second electric length;

wherein the one end sides of the first element part and the second element part are connected to each other by a reactance part having a reactance component; and wherein the other end side of one element part of the two element parts serves a feeding part.

8. The communication terminal according to claim 7, wherein the electric length of the first element part is set to ¼ times as long as the wavelength 1 of a first frequency; and wherein the electric length of the second element part is formed so that the sum of the electric length of the second element part and the electric length of the first element part is set to ¼ or ⅜ times as long as the wavelength 2 of a second frequency.

9. The communication terminal according to claim 1, wherein a receiving part and a transmitting part are provided in exposed surface sides of the two casing members which are exposed when the two casing members are changed from a closed state to a opened state; and wherein the antenna is disposed near the hinge portion provided in a back surface side opposite to the exposed surfaces.

10. The communication terminal according to claim 1, wherein a cable which electrically connects the first printed circuit board to the second printed circuit board is provided; and wherein the cable is inserted into the first rotating member and is arranged to be drawn out from the other end side of the first rotating member.

* * * * *